United States Patent
Rai et al.

(10) Patent No.: US 11,978,085 B2
(45) Date of Patent: May 7, 2024

(54) SYSTEM AND METHOD FOR PROVIDING PERSONALIZED NOTIFICATIONS IN MOBILE APPLICATIONS

(71) Applicant: The Toronto-Dominion Bank, Toronto (CA)

(72) Inventors: Ekas Kaur Rai, Mississauga (CA); Yana Tzanov, Toronto (CA); Andrew Jhamiel Montgomery, Whitby (CA); Maryam Karbasi, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/408,964

(22) Filed: Aug. 23, 2021

(65) Prior Publication Data

US 2023/0011585 A1     Jan. 12, 2023

Related U.S. Application Data

(63) Continuation-in-part of application No. 17/305,528, filed on Jul. 9, 2021.

(51) Int. Cl.
    *G06Q 30/0226*      (2023.01)
    *H04L 67/133*      (2022.01)

(52) U.S. Cl.
     CPC ..... *G06Q 30/0227* (2013.01); *G06Q 30/0233* (2013.01); *H04L 67/133* (2022.05)

(58) Field of Classification Search
     CPC . G06Q 30/0207–0277; G06Q 30/0227; G06Q 30/0233; H04L 67/40; H04L 67/133; H04L 67/12; H04L 67/1396; H04L 67/55
See application file for complete search history.

(56) References Cited

U.S. PATENT DOCUMENTS

| | | |
|---|---|---|
| 7,398,225 B2 | 7/2008 | Votmer et al. |
| 7,578,430 B2 | 8/2009 | Michelsen et al. |
| | (Continued) | |

FOREIGN PATENT DOCUMENTS

| | | |
|---|---|---|
| KR | 10-1945287 | 2/2018 |
| WO | 2018/174813 A1 | 9/2018 |
| | (Continued) | |

OTHER PUBLICATIONS

What Is the Rakuten Cash Back Button? Rakuten https://www.rakuten.com/help/article/what-is-the-rakuten-cash-back-button-360002116947; https://www.rakuten.com/button.htm; Retrieved from the Internet Oct. 10, 2021.

*Primary Examiner* — Chinyere Mpamugo
(74) *Attorney, Agent, or Firm* — CPST Intellectual Property Inc.; Brett J. Slaney

(57) ABSTRACT

A system and method are provided for providing personalized notifications in mobile applications. The method includes receiving from an enterprise system, transactional activity data associated with a user of a client device; and receiving from at least one loyalty system, loyalty data associated with loyalty offers eligible to the user of the client device. The method also includes analyzing the activity data and the loyalty data to correlate at least one spending indicator from the activity data with at least one of the eligible loyalty offers and generating a personalized notification based on a correlation determined from the analyzing. The method also includes integrating the personalized notification into a graphical user interface of a mobile application provided by the enterprise system, receiving an indication of the selected loyalty offer, and sending to the corresponding loyalty system, an instruction to execute the selected eligible loyalty offer.

20 Claims, 17 Drawing Sheets

(56) References Cited

U.S. PATENT DOCUMENTS

| | | |
|---|---|---|
| 8,660,893 B2 | 2/2014 | Fordyce, III |
| 8,725,633 B1 | 5/2014 | Bauer et al. |
| 8,732,013 B2 | 5/2014 | Senghore et al. |
| 9,990,646 B2 | 6/2018 | Salmon et al. |
| 10,198,740 B2 | 2/2019 | Badger et al. |
| 10,223,707 B2 | 3/2019 | Granville, III |
| 10,304,075 B2 | 5/2019 | Walz et al. |
| 10,467,647 B2 | 11/2019 | Kim et al. |
| 10,496,979 B2 | 12/2019 | Taveau et al. |
| 10,521,820 B1 | 12/2019 | Jarvis et al. |
| 10,535,077 B2 | 1/2020 | Enriquez et al. |
| 10,540,675 B2 | 1/2020 | Tietzen et al. |
| 10,740,768 B2 | 8/2020 | Skowronek et al. |
| 10,839,366 B2 | 11/2020 | Venkatesan et al. |
| 10,846,746 B2 | 11/2020 | Windmueller |
| 10,861,041 B2 | 12/2020 | Tietzen et al. |
| 10,867,317 B2 | 12/2020 | Ladds et al. |
| 10,878,398 B2 | 12/2020 | Bloy et al. |
| 10,878,440 B1 | 12/2020 | Bermudez et al. |
| 2002/0082920 A1 | 6/2002 | Austin et al. |
| 2002/0123926 A1 | 9/2002 | Bushold et al. |
| 2003/0040964 A1 | 2/2003 | Lacek |
| 2005/0071227 A1 | 3/2005 | Hammad et al. |
| 2005/0144071 A1 | 6/2005 | Monahan et al. |
| 2008/0133351 A1 | 6/2008 | White et al. |
| 2010/0082420 A1 | 4/2010 | Trifiletti et al. |
| 2010/0106570 A1 | 4/2010 | Radu et al. |
| 2012/0053987 A1* | 3/2012 | Satyavolu ............. H04M 15/84 705/7.29 |
| 2012/0101881 A1 | 4/2012 | Taylor et al. |
| 2013/0036001 A1 | 2/2013 | Wegner et al. |
| 2013/0124263 A1 | 5/2013 | Amaro et al. |
| 2013/0325579 A1 | 12/2013 | Salmon et al. |
| 2015/0149272 A1 | 5/2015 | Salmon et al. |
| 2015/0170180 A1 | 6/2015 | Itwaru |
| 2015/0348083 A1* | 12/2015 | Brill .................... G06Q 20/386 705/14.23 |
| 2016/0048864 A1 | 2/2016 | Beer |
| 2016/0071140 A1 | 3/2016 | Sherman |
| 2017/0024759 A1 | 1/2017 | Taneja et al. |
| 2017/0278125 A1 | 9/2017 | Tietzen et al. |
| 2018/0268401 A1 | 9/2018 | Ortiz |
| 2018/0276710 A1* | 9/2018 | Tietzen ............. G06Q 30/0269 |
| 2018/0293573 A1 | 10/2018 | Ortiz et al. |
| 2019/0108542 A1 | 4/2019 | Durvasula et al. |
| 2019/0180310 A1 | 6/2019 | Jones |
| 2019/0180311 A1 | 6/2019 | Chan et al. |
| 2020/0051112 A1 | 2/2020 | Nelson et al. |
| 2020/0082427 A1 | 3/2020 | Gleeson et al. |
| 2020/0126107 A9 | 4/2020 | Shah et al. |
| 2020/0134657 A1 | 4/2020 | Darmo et al. |
| 2020/0234327 A1 | 7/2020 | Salloum |
| 2020/0242669 A1 | 7/2020 | Carroll et al. |
| 2020/0279288 A1 | 9/2020 | Song |
| 2021/0150560 A1 | 5/2021 | Gupta et al. |
| 2021/0377260 A1 | 12/2021 | Phillips |

FOREIGN PATENT DOCUMENTS

| | | |
|---|---|---|
| WO | 2020/167614 A1 | 8/2020 |
| WO | 2021/067949 A1 | 4/2021 |

* cited by examiner

| Nudge Action | Trigger | Nudge Location |
|---|---|---|
| Loyalty Partner | Partner promo, X spend | Above transactions |
| Points convert | Points A = reward B | Loyalty Page |
| Goals summary | Scroll or select | Loyalty Page |
| | | |
| | | |
| | | |
| | | |
| | | |

FIG. 3

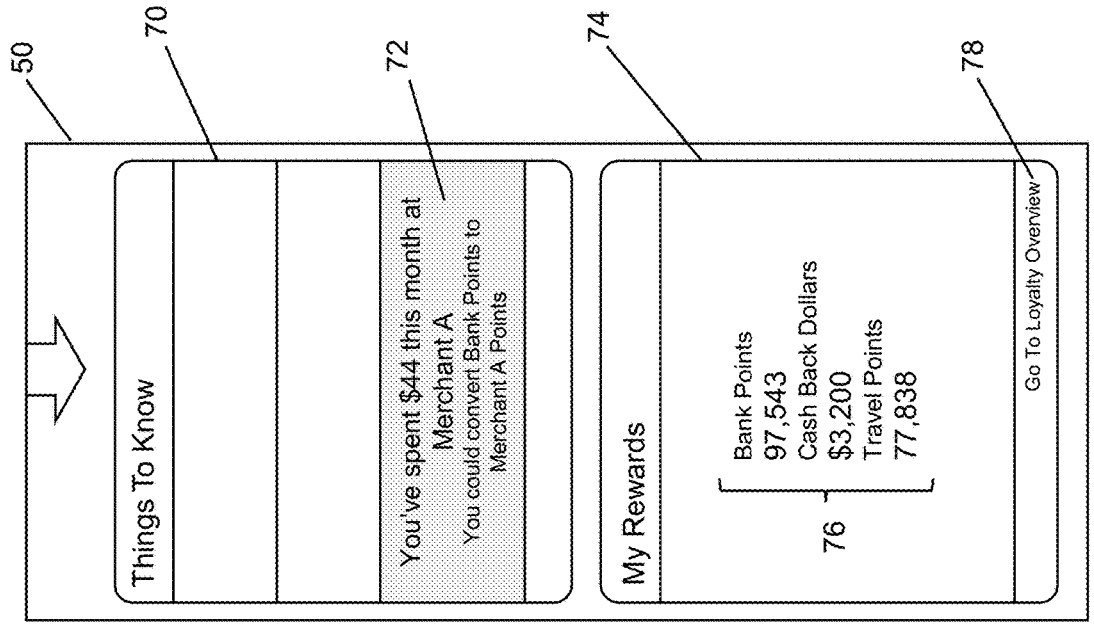
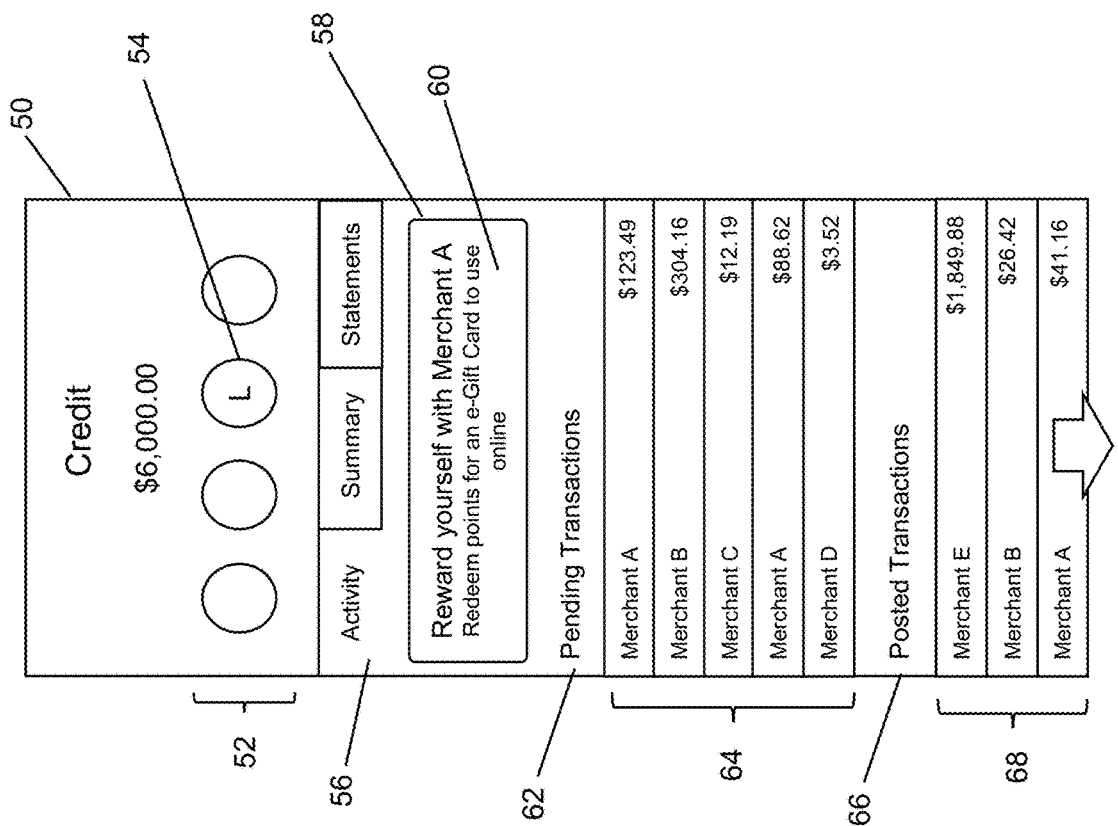
FIG. 5
FIG. 4

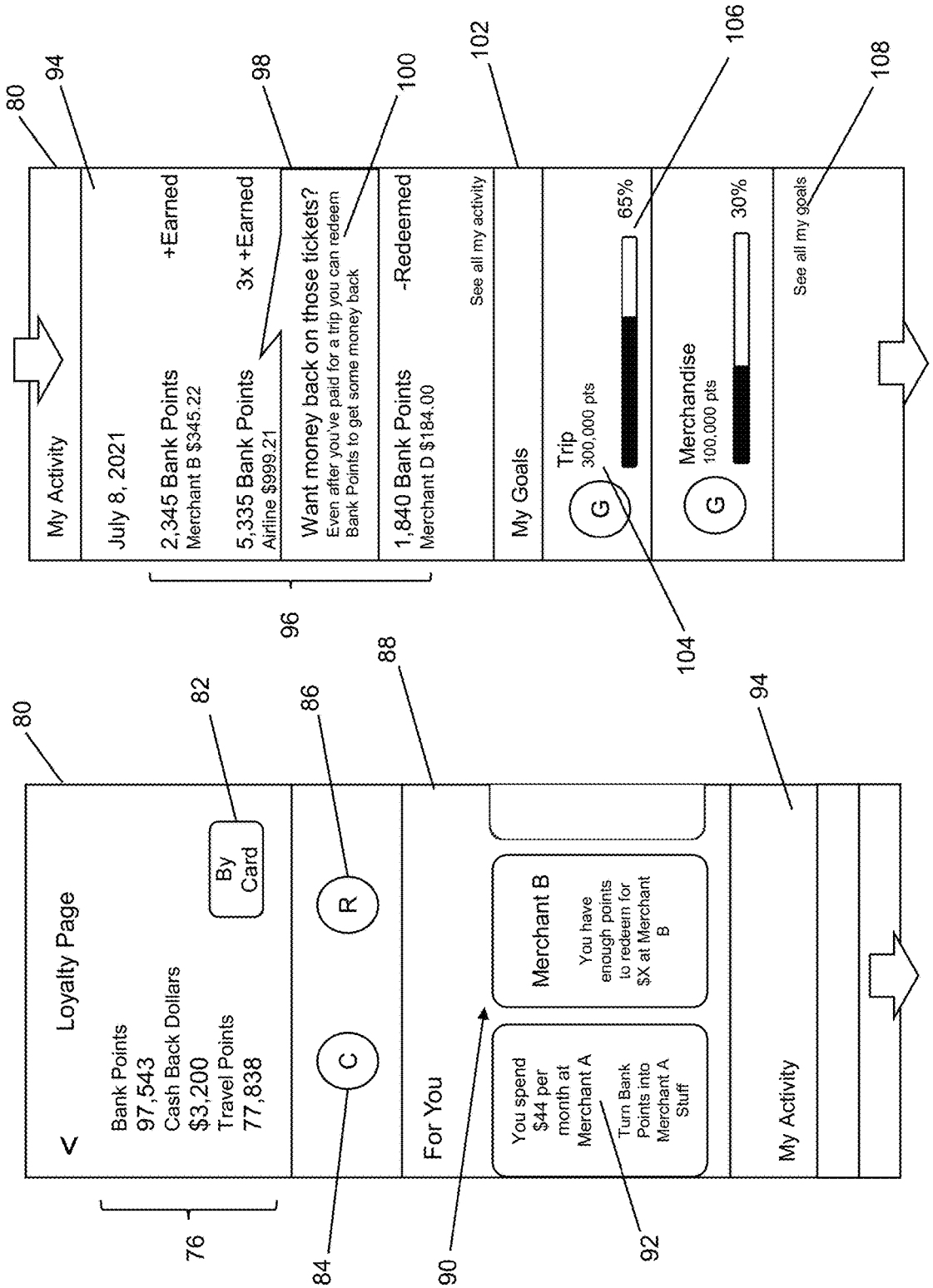

SYSTEM AND METHOD FOR PROVIDING PERSONALIZED NOTIFICATIONS IN MOBILE APPLICATIONS

CROSS-REFERENCE TO RELATED APPLICATIONS

This application is a Continuation-in-Part of U.S. patent application Ser. No. 17/305,528 filed on Jul. 9, 2021, entitled "System and Method for Integrating Loyalty Program Partner Systems with an Enterprise System" and the entire contents of which is incorporated herein by reference.

TECHNICAL FIELD

The following relates generally to providing personalized notifications in mobile applications.

BACKGROUND

Mobile applications (also referred to as "apps") are continuing to increase in popularity with customers and clients and are therefore increasingly adopted by businesses, agencies and other organizations. With these increases in popularity and adoption, customers are found to expect such mobile apps to be able to do more and more for the user in order to get more out of their mobile experience. For example, when this is not the case, in some experiences, customers may be unable to find information or may not even be aware of the capabilities of a mobile app.

While the user can explore and experiment with features within the app and determine the features on their own, in many cases these users become frustrated and may seek assistance. For example, the user may contact a live agent using a telephone or chat channel to determine how to find and use certain features, which is burdensome to both the user and to the enterprise hosting and providing services via the mobile app.

Given the form factor and limited screen size of many mobile devices (such as smart phones and tables), while mobile apps are meant to be powerful and convenient (by taking advantage of increasingly convenient processing power and network connectivity), they should be simple to use with a clean and uncluttered interface. There exists a challenge in balancing these competing objectives while keeping the user engaged and using the mobile app as a primary point of contact. For example, too much generic information can be overwhelming to a user and too little information means the user may miss certain functionalities or features or be unable to figure out how to use the functionalities or features.

Mobile apps may also include or provide links to loyalty programs. Loyalty programs are evolving from a one size fits all approach focused on aspirational travel rewards, to accessible everyday rewards offerings. Many new credit card offerings, for example, focus heavily on the everyday rewards space. Everyday rewards typically require digital infrastructure, including a loyalty interface, in order to integrate them into existing enterprises, particularly financial institutions with traditional travel-based reward cards.

Having to manage several loyalty accounts to determine when points can be redeemed, what can be redeemed, and if any special promotions apply can be difficult. Users may miss out on certain promotions or let points expire if the forget to check balances or engage with the loyalty account and associated app, leading to some of the aforementioned frustrations and difficulties.

BRIEF DESCRIPTION OF THE DRAWINGS

Embodiments will now be described with reference to the appended drawings wherein:

FIG. 3 is an example of a rule set for nudge actions associated with personalized notifications integrated into a mobile application.

FIG. 4 is an example of a graphical user interface for a mobile application in which a personalized notification is displayed for loyalty partner.

FIG. 5 is an example of a graphical user interface for displaying additional personalized notifications and details of available rewards balances.

FIG. 6 is an example of a graphical user interface for a mobile application in which a loyalty overview page with multiple personalized notification areas.

FIG. 7 is an example of a graphical user interface for the loyalty overview page showing a retroactive loyalty offer and a loyalty points goals portion.

DETAILED DESCRIPTION

Figure 1:
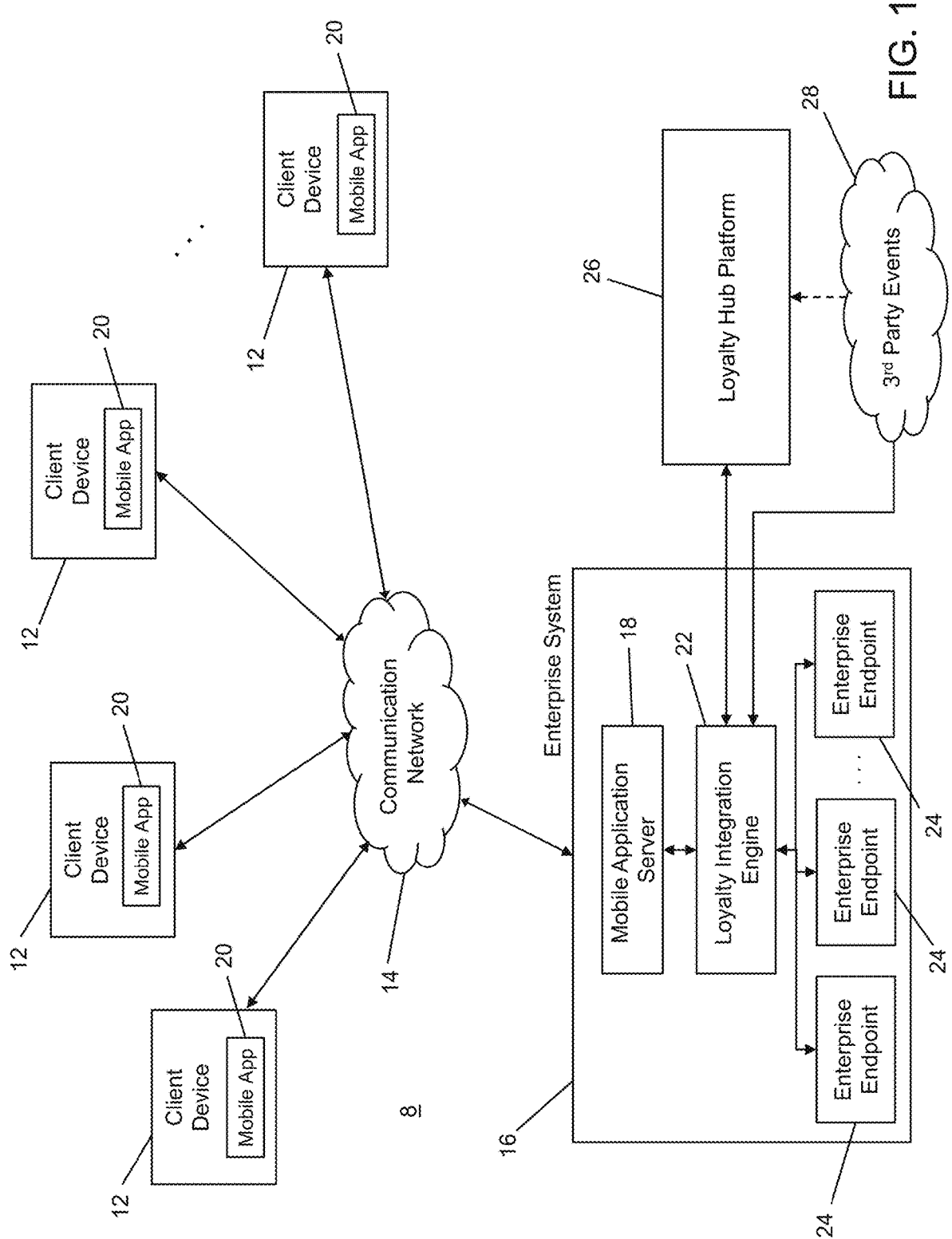
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

By leveraging a loyalty hub platform and its architecture, a banking or other mobile app can integrate enhanced user experiences by having a loyalty integration engine operate between the user interface of the mobile app and the loyalty hub platform to not only coordinate and access rewards and offers from multiple loyalty programs, but also create contextual and personalized offers in the app based on actual customer data, including transaction data. This proactive approach not only benefits the customer and the loyalty partners by targeting the customer with relevant offers, but also can benefit the associated financial institution (e.g., bank providing banking app) by focusing loyalty activities on the app, and by keeping the customer in the mobile app longer and more often.

The loyalty integration engine can leverage artificial intelligence (AI)/machine learning (ML) tools and techniques to perform predictive or probabilistic analytics, or to build and refine models that are used to strategically select the day/time, location, and cadence of such personalized notifications.

It will be appreciated that while examples provided herein are directed to customer/client interactions in mobile applications and with loyalty systems associated with or provided by a financial institution environment, the principles discussed herein equally apply to other types of enterprises, for example, any customer service, e-learning, training, or other enterprise providing an interactive experience via a mobile application.

Certain example systems and methods described herein are able to determine, prepare, and integrate personalized notifications into mobile applications. In one aspect, there is provided a server device for providing personalized notifications in mobile applications. The server device includes a processor, a communications module coupled to the processor, and a memory coupled to the processor. The memory stores computer executable instructions that when executed by the processor cause the processor to receive from an enterprise system, via the communications module, transactional activity data associated with a user of a client device; and receive from at least one loyalty system, via the communications module, loyalty data associated with loyalty offers eligible to the user of the client device. The memory also stores computer executable instructions that when executed by the processor cause the processor to analyze the activity data and the loyalty data to correlate at least one spending indicator from the activity data with at least one of the eligible loyalty offers, and generate a personalized notification based on a correlation determined from the analyzing. The memory also stores computer executable instructions that when executed by the processor cause the processor to integrate the personalized notification into a graphical user interface of a mobile application provided by the enterprise system, the personalized notification comprising at least one option to redeem loyalty points to execute a selected eligible loyalty offer. The memory also stores computer executable instructions that when executed by the processor cause the processor to receive from the mobile application, via the communications module, an indication of the selected loyalty offer; and send to the corresponding loyalty system, an instruction to execute the selected eligible loyalty offer.

In another aspect, there is provided a method of providing personalized notifications in mobile applications. The method includes receiving from an enterprise system, transactional activity data associated with a user of a client device; and receiving from at least one loyalty system, loyalty data associated with loyalty offers eligible to the user of the client device. The method also includes analyzing the activity data and the loyalty data to correlate at least one spending indicator from the activity data with at least one of the eligible loyalty offers; and generating a personalized notification based on a correlation determined from the analyzing. The method also includes integrating the personalized notification into a graphical user interface of a mobile application provided by the enterprise system, the personalized notification comprising at least one option to redeem loyalty points to execute a selected eligible loyalty offer. The method also includes receiving from the mobile application, an indication of the selected loyalty offer; and sending to the corresponding loyalty system, an instruction to execute the selected eligible loyalty offer.

In another aspect, there is provided a non-transitory computer readable medium for providing personalized notifications in mobile applications. The computer readable medium includes computer executable instructions for receiving from an enterprise system, transactional activity data associated with a user of a client device; and receiving from at least one loyalty system, loyalty data associated with loyalty offers eligible to the user of the client device. The computer readable medium also includes computer executable instructions for analyzing the activity data and the loyalty data to correlate at least one spending indicator from the activity data with at least one of the eligible loyalty offers; and generating a personalized notification based on a correlation determined from the analyzing. The computer readable medium also includes computer executable instructions for integrating the personalized notification into a graphical user interface of a mobile application provided by the enterprise system, the personalized notification comprising at least one option to redeem loyalty points to execute a selected eligible loyalty offer. The computer readable medium also includes computer executable instructions for receiving from the mobile application, an indication of the selected loyalty offer; and sending to the corresponding loyalty system, an instruction to execute the selected eligible loyalty offer.

In certain example embodiments, the server device can receive from a third party entity, via the communications module, event data associated with at least one loyalty system having eligible offers redeemable via the mobile application; and use the event data to determine a timing of integrating the personalized notification into the graphical user interface. The event data can be associated with a promotional event for which the selected loyalty offer is useable.

In certain example embodiments, the at least one spending indicator is indicative of a transaction that could have used loyalty points to offset a purchase, the notification providing an option to retroactively apply loyalty points to the transaction.

In certain example embodiments, the at least one spending indicator is indicative of transactions with a loyalty partner of the enterprise system that has available rewards or points.

In certain example embodiments, a plurality of loyalty systems can be integrated into a loyalty platform, the loyalty platform comprising a hub architecture for integrating multiple loyalty partners with a banking app associated with the graphical user interface, the server device providing a communications layer between the graphical user interface and the hub architecture to provide the personalized notifications within the graphical user interface according to at least one criterion.

In certain example embodiments, the server device can determine a user defined goal associated with the at least one loyalty system, and use the user defined goal to determine the personalized notification or an additional notification to be displayed in the graphical user interface.

In certain example embodiments, the server device can obtain a model trained by a machine learning engine to automatically determine correlations between the activity data and the loyalty data; and use the model to determine the correlation. The model can be periodically retrained using tracking data indicative of usage of the personalized notifications during a previous period of time.

In certain example embodiments, the server device can receive from the at least one loyalty system, via the communications module, redemption data associated with past loyalty redemptions by the user; and use the redemption data with the correlation data in generating the personalized notification.

FIG. 1 illustrates an exemplary computing environment 8. In one aspect, the computing environment 8 may include an enterprise system 16 having a loyalty integration engine 22, a loyalty hub platform 26, third party events 28 (e.g., from data and information available online and/or made available via third party systems), one or more client devices 12, and a communications network 14 connecting one or more components of the computing environment 8.

The enterprise system 16 may be associated with a financial institution system (e.g., for a commercial bank) that provides financial services accounts to users and processes financial transactions associated with those financial service accounts. This can include providing customer service options via a mobile application (app) 20 that can be downloaded to and used by users of the client devices 12. The enterprise system 16 includes a mobile application server 18 used to host or serve the mobile app 20 and the loyalty integration engine 22 provides an interactive layer between the mobile application server 18 and one or more enterprise endpoints 24 and the loyalty hub platform 26. Each enterprise endpoint 24 can be associated with a department, line of business, service or other entity or sub-entity within or associated with the enterprise system 16. For example, in a financial institution system, one enterprise endpoint 24 can be associated with everyday banking while another endpoint 24 can be associated with credit accounts or investment accounts, mortgages, insurance, etc. While several details of the enterprise system 16 have been omitted for clarity of illustration, reference will be made to FIG. 12 below for additional details.

The loyalty hub platform 26 can be a separate entity as shown in FIG. 1 or a component of the enterprise system 16. As discussed herein, the loyalty hub platform 26 can be leveraged by the enterprise system 16 to integrate personalized loyalty-based notifications, offers, tips, and other information, by also leveraging access to the data and information available internally via the enterprise endpoints 24 and client data 30.

Client devices 12 may be associated with one or more users. Users may be referred to herein as customers, clients, correspondents, agents, or other entities that interact with the enterprise system 16 and/or loyalty integration engine 22 (directly or indirectly). The computing environment 8 may include multiple client devices 12, each client device 12 being associated with a separate user or associated with one or more users. In certain embodiments, a user may operate client device 12 such that client device 12 performs one or more processes consistent with the disclosed embodiments. For example, the user may use client device 12 to engage and interface with a mobile or web-based banking application (i.e., the mobile app 20) which permits the loyalty integration engine 22 to determine and provide personalized notifications to the mobile app 20 of a particular or particular ones of the client devices 12. In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of client devices 12. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In one embodiment, loyalty integration engine 22 may be one or more computer systems configured to process and store information and execute software instructions to perform one or more processes consistent with the disclosed embodiments. In certain embodiments, although not required, loyalty integration engine 22 may be associated with one or more business entities. In certain embodiments, the loyalty integration engine 22 may represent or be part of any type of business entity. For example, loyalty integration engine 22 may be a system associated with a commercial bank (e.g., enterprise system 16), a retailer, utility, government entity, educational institution, or some other type of business. The loyalty integration engine 22 can also operate as a standalone entity (see, e.g., FIG. 2) that is configured to serve multiple business entities, e.g., to act as an agent therefor.

Continuing with FIG. 1, the loyalty integration engine 22 and/or enterprise system 16 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the loyalty integration engine 22 and enterprise system 16. The cryptographic server may be used to protect sensitive data (e.g., financial data) and/or client data 30 and/or mobile app data 36 (see, e.g., FIG. 2) and/or loyalty data 32 (see also FIG. 2) and/or data stored in a datastore storing nudge rules 34 (see also FIG. 2), by way of encryption for data protection, digital signatures or messsage digests for data integrity, and by using digital certificates to authenticate the identity of the users and client devices 12 with which the enterprise system 16 and/or loyalty integration engine 22 communicates to inhibit data breaches by adversaries. It can be appreciated that various cryptographic mechanisms and protocols can be chosen and implemented to suit the constraints and requirements of the particular deployment of the loyalty integration engine 22 or enterprise system 16 as is known in the art.

Figure 2:
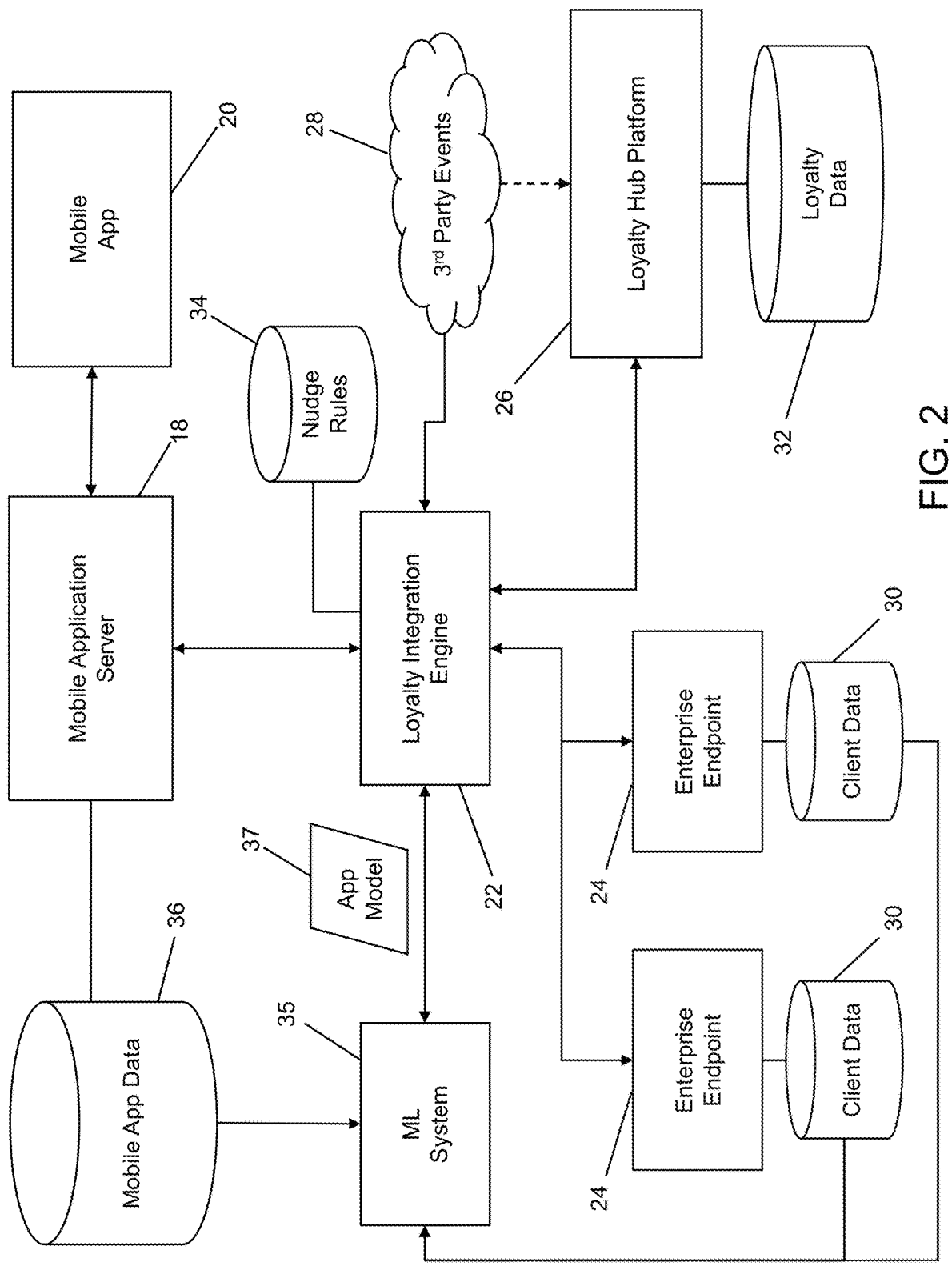
FIG. 2 is a schematic diagram of a loyalty integration engine coupled to multiple enterprise endpoints, a mobile application server, and a loyalty hub platform, to provide personalized notifications to a mobile application.

Referring now to FIG. 2, the loyalty integration engine 22 is shown as coupled to various components, entities, and services of, or associated with, the enterprise system 16 and mobile app 20 whether the loyalty integration engine 22 is integrated into the enterprise system 16 or provided separately as a service therefor. The loyalty integration engine 22 is also coupled to or associated with the loyalty hub platform 26 and other external entities or services that provide or can be analyzed to obtain third party events 28, such as promotions provided by a loyalty partner associated with the loyalty hub platform 26.

The loyalty integration engine 22 is positioned and operable between the mobile application server 18 and, in this example, a number of enterprise endpoints 24 to coordinate and deliver personalized notifications to the mobile app 20 that are associated with loyalty partners or other loyalty programs associated with the enterprise system 16 and/or loyalty hub platform 26 and which leverages details of accounts, client data 30, products, services, or features of the mobile app 20 that are handled or provided by certain enterprise endpoints 24. For example, a personalized notification can be generated by the loyalty integration engine 22 based on transactional account information pulled from one or more enterprise endpoints 24 that can be correlated to loyalty data 32 associated with the loyalty hub platform 26. In this way, the loyalty integration engine 22 provides an intermediary to coordinate and integrate features of the mobile app 20 and loyalty hub platform 26 through a common integrated interface. In this example, each enterprise endpoint 24 includes or has access to client data 30 associated with one or more accounts for users of client devices 12 running the mobile app 20. However, it can be appreciated that multiple endpoints 24 can have access to the same client data 30 in other configurations.

The mobile application server 18 includes or otherwise has access to a datastore for storing mobile app data 36, which can include data also stored as client data 30 by an enterprise endpoint 24 and/or provide a cache for same. The data 30, 36, 32 may include any information or content, such as account data, personal data, conversation scripts or other contextual data (e.g., from call center interactions), metadata, tags, notes, files (e.g., PDFs), links (e.g., uniform resource locators (URLs)), images, videos, etc. that are created from or otherwise relate to interactions (e.g., conversations) between entities in the computing environment 8, in particular those made using client devices 12 via one or more communication channels available via the communication network 14 or other communication networks 14. As such, the data 30, 32, 36 can be used by the loyalty integration engine 22 in performing operations such as those described herein. The client data 30 may include both data associated with a user of a client device 12 that interacts with the enterprise system 16 and mobile app 20 (e.g., for participating in mobile banking and using customer service channels associated with such banking) and transaction history data that is captured and provided with a transaction entry, e.g., in the graphical user interface of a mobile or web-based banking application. The data associated with a user can include client profile data that may be mapped to corresponding financial data for that user and/or may include some of the financial data. Client profile data can include both data that is associated with a client as well as data that is associated with one or more user accounts for that client as recognized by the computing environment 8.

The data associated with a client may include, without limitation, demographic data (e.g., age, gender, income, location, etc.), preference data input by the client, and inferred data generated through machine learning, modeling, pattern matching, or other automated techniques. The client profile data may also include historical interactions and transactions associated with the enterprise system 16, e.g., login history, search history, communication logs, metadata, files, documents, etc.

It can be appreciated that the datastores used to store client data 30, loyalty data 32, and mobile app data 36 are shown as separate components from the enterprise endpoints 24, mobile application server 18/enterprise system 16, and loyalty hub platform 26 for illustrative purposes only and may also be at least partially stored within a database, memory, or portion thereof within the enterprise system 16.

The loyalty integration engine 22 includes or has access to a machine learning system 35, which can be employed to train one or more models 37 based on established logic and/or historical data concerning past delivery of personalized notifications, what is used to trigger such notifications, and at which day/time, location, cadence, etc. they are displayed. The machine learning system 35 can employ various machine learning techniques and can be used over time to continuously train and retrain models 37 based on new personalized notifications and client data 30 as discussed in greater detail below.

By integrating or coupling the loyalty integration engine 22 to multiple enterprise endpoints 24 in the enterprise system 16 and to the loyalty hub platform 26, the loyalty integration engine 22 can take into account different sets of client data 30 and indicators or flags detectable from that data 30 to provide coordinated personalized notifications to the mobile app 20 without overwhelming the user of the mobile app 20. In this way, a single personalization "hub" can be provided in an extensible and scalable manner to adapt to changing configurations and to accommodate new entities and services provided within the enterprise system 16 while maintaining consistency and familiarity of the personalized notifications for the user. The ML system 35 and app model 37 can be used to leverage detectable events, triggers, or flags and successful personalized notifications provided to other users and to retrain the app model 37 over time as experiences with the nudges provided by these personalized notifications are tracked. The app model 37 can be used by the loyalty integration engine 22 to determine when personalized notifications may be appropriate based on the current state of an account or other characteristic of the client data 30, what loyalty offers are available and/or eligible to that user, and a set of nudge rules 34 that can be used to map certain triggers and/or days/times to actions and locations within the mobile app 20 in which to deliver the personalized notification.

For example, as illustrated in examples described below, the mobile app 20 can be designed to include portions or panes of the user interface, also referred to herein as "nudge cards" or notification portions/areas/locations. In this way different actions can be associated with different triggers and/or nudge locations to prioritize and differentiate the urgency or importance of certain personalized notifications. The nudge rules 34 can also provide a flexible rule set data structure to incorporate both enterprise-imposed rules and user preferences. For example, a user may wish to suppress personalized notifications in certain locations/areas of the mobile app 20 or have all personalized notifications displayed in the same area. Certain nudge actions can also be dismissed or ignored by the user to have them suppressed by the loyalty integration engine 22.

FIG. 3 illustrates an example of a rule set for the nudge rules 34. In this example, the rule set includes a nudge rule 48 in each row, with a series of characteristics of each rule 48 in a series of corresponding columns. Each rule 48 in this example has a corresponding nudge action 42, i.e., the type of personalized notification that is to be displayed; a corresponding trigger 44, i.e., at least one criterion that dictates when the nudge action 42 is to be displayed. For example, the trigger 44 can specify a periodic reminder (e.g., once per week) or an asynchronous trigger such as a threshold balance, status event (e.g., loyalty offer or promotion), third party event 28, user interaction, system event, administrator action/event, etc. Each rule 48 also includes a corresponding nudge location 46 which can be used to further customize the delivery of personalized notifications by specifying where in the mobile app 20 the notification is to be displayed. For example, promotions related to recent transactions may be displayed in a launch window or pane, adjacent (e.g., above) account details, or both. Moreover, promotional offers that are time sensitive may be displayed in a more prominent location, such as immediately upon launching the mobile app 20.

In FIG. 3, three examples are listed; and it can be appreciated that any number of rules 48 can be created, refined, removed, suppressed, or otherwise utilized on a per-service or per-client basis. The three examples include a loyalty partner alert, a points conversion notification, and a goals summary option. The loyalty partner notification in this example is triggered by correlating a loyalty partner promotion to a predetermined spend X on an item or category, at a particular merchant, etc. That is, this notification is triggered by correlating client data 30 with loyalty data 32 by leveraging both the enterprise system endpoints 24 and the loyalty hub platform 26. The points conversion notification in this example is triggered by the existence and/or availability of certain points to that user. For example, if the loyalty integration engine 26 detects that the user has been making purchases at a certain merchant and they have points available that could be redeemed for a gift card or points at that merchant, the loyalty integration engine 26 can make this correlation to integrate a personalized notification into the mobile app 20. The goals summary notification in this example can provide an ongoing or permanent location within the mobile app 20 (e.g., a loyalty page) in which the user can create and the loyalty integration engine 26 can track the progress of certain loyalty-related goals such as saving points to redeem for certain merchandise.

Referring now to FIGS. 4 through 9 example use cases for having the loyalty integration engine 22 determine and provide personalized notifications to the mobile app 20, are shown. FIG. 4 illustrates a mobile app user interface (UI) 50. The app UI 50 includes a banner portion providing a number of options 52, including a quick link loyalty option 54 that links to a loyalty page 80 (see FIG. 6). The app UI 50 includes a number of tabs, including an activity tab 56. The activity tab 56 in this example includes a personalized notification card 58 above a pending transactions portion 62. The personalized notification card 58 includes details 60 of a personalized loyalty-based notification. In this example, an eligible offer or loyalty-based transaction for Merchant A is flagged, to remind or notify the user that points can be redeemed for an e-gift card to use online. For example, the loyalty integration engine 22 can detect that the user has shopped at Merchant A and correlate that to an eligible or available gift card redemption for that merchant. In this way, the user can be notified or reminded of ways to use points available through the loyalty hub platform 26 and/or available directly via points provided by the enterprise system 16. The pending transactions portion 62 are associated with a credit card and includes a list of merchant purchases 64. It can be appreciated that the notification card 58 can be strategically placed above such purchases 64 to highlight correlations made between transactions and available loyalty offers and rewards. In this example, the activity tab 56 also displays a posted transactions portion 66 that includes a number of posted transactions 68. As illustrated in FIG. 4, the user can scroll further down the app UI 50 (as illustrated using an arrow), to display content as shown in FIG. 5.

Referring now to FIG. 5, the mobile app UI 50 can also include a Things to Know portion 70 that can provide informational loyalty-based personalized notifications 72. In this example, the loyalty integration engine 22 detects that the user has spent $44 this month with Merchant A and suggests an available loyalty-based option for that user. Also shown in FIG. 5 is a My Rewards portion 74 to enable a points summary 76 to be displayed, with points handled by or otherwise associated with the enterprise system 16 and/or loyalty hub platform 26. A Go To Loyalty Overview option 78 is displayed to enable the user to navigate to the loyalty page 80 (see FIG. 6), in the same way as selecting the loyalty option 54 as seen in FIG. 4.

FIG. 6 illustrates the loyalty page 80. In this example, the loyalty page 80 includes the points summary 76 that was included in portion 74, along with a By Card option 82 to enable the user to drill into more loyalty details based on the different cards they are using. The loyalty page 80 also includes a conversion option 84 for converting points, and a redeem option 86 for redeeming specific points, e.g., to obtain an e-gift card, merchandise, travel rewards, etc. The loyalty page 80 also includes a For You portion 88, which can be used to provide a scrollable or swipeable carousel of personalized offers or personalized notifications 92. In this example, a notification similar to the one shown in the Things to Know portion 70 (see FIG. 5) is shown, alongside a suggestion that the user has enough points to redeem a certain amount to spend at Merchant B. A My Activity portion 94 is also shown at the bottom of FIG. 6 and can be scrolled or swiped into as shown in FIG. 7.

As shown in FIG. 7, the My Activity portion 94 can include a number of earning or redemption activities 96. The loyalty integration engine 22 can be used to target specific transactions or activities to suggest loyalty-related actions. In this case, a retroactive notification 98 is shown, which aligns with a previous earning activity 96 which a purchase was made that could have been done using loyalty points. By having access to transaction data as well as loyalty data 32 and the loyalty hub platform 26, the loyalty integration engine 22 is in an advantageous position to correlate the data 30, 32 and provide the user with an option to retroactively apply points to offset a purchase. The loyalty integration engine 22 also enables these notifications to be integrated into the mobile app 20 in a way that is more readily seen by the user and can be tailored to how the user uses the mobile app 20, e.g., by using a trained model 37 that is refined over time as the user interacts with the mobile app 20. In addition to the inline flagging of certain transactions, the user can also be provided with a My Goals portion 102 to enable them to set certain loyalty-related goals. In this example a travel goal 104 showing its associated target points is displayed along with a progress bar 106. Similarly, a merchandise goal 104 with a progress bar 106 is also shown. A See all my goals option 108 can be used to highlight certain goals (e.g., most recent) while allowing others to be available to the user.

Figure 8:
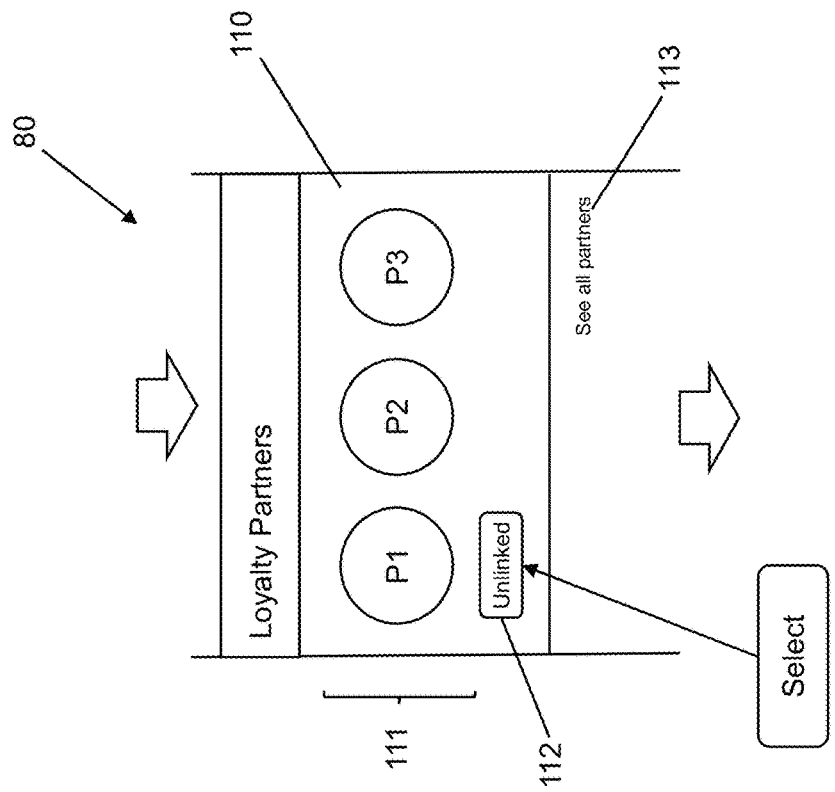
FIG. 8 is an example of a graphical user interface for the loyalty overview page in which a loyalty partner linkage portion is shown.

FIG. 8 illustrates a further portion of the loyalty page 80 that can be scrolled or swiped to, namely a loyalty partners portion 110. This allows the loyalty integration engine 22 to populate loyalty partners associated with the loyalty hub platform 26 to provide further integration between the mobile app 20 and the loyalty options available to the user. The loyalty partners portion 110 includes a number of logos 111 or other indicia associated with certain loyalty partners. A See all partners option 113 can be provided if additional partners are available. It can be appreciated that the partners shown using the logos 111 can be selected based on relevance, recent activities by the user, recent promotions, etc. Here an unlinked button 112 is shown, to highlight an available loyalty partner that has not been linked to this user. By selecting this button 112, an associated loyalty partner page 114 can be launched as shown in FIG. 9.

Figure 9:
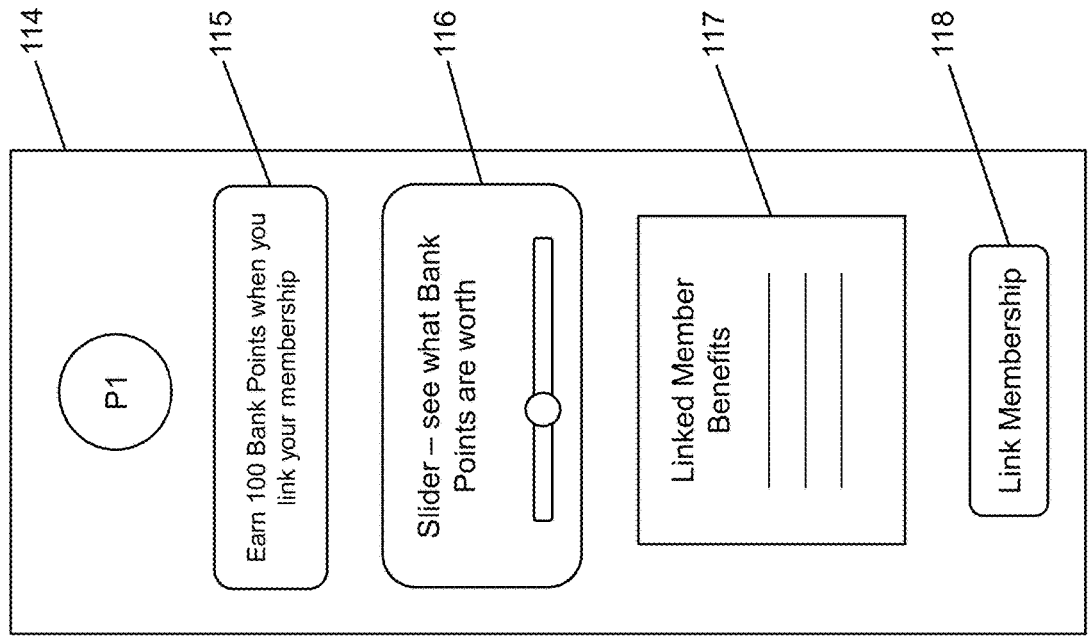
FIG. 9 is an example of a graphical user interface for a loyalty partner user interface having an option to link loyalty memberships.

As shown in FIG. 9, the loyalty partner page 114 can include various alerts, notifications, comments and features. For example, a first time notification 115 indicates that if the user links their memberships they will receive certain points. A slider 116 is also shown to enable the user to determine how many points for the associated loyalty partner could be obtained by converting bank points (i.e., points provided by the enterprise system 16). A linked member benefits portion 117 enables informational posts to be displayed to assist the user in deciding whether to link memberships. A link membership option 118 enables the user to launch a linked loyalty flow by interacting with the loyalty hub platform 26 as described later making reference to FIGS. 15-18.

Figure 10:
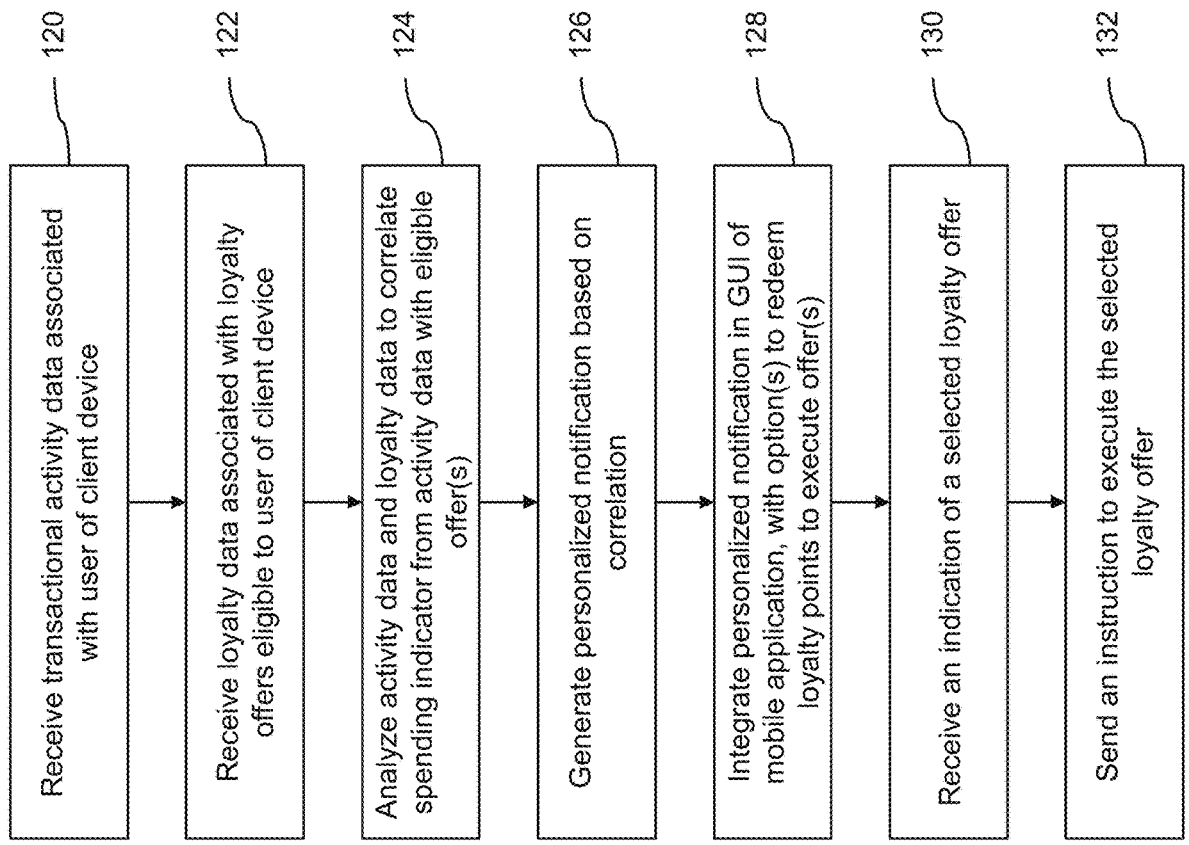
FIG. 10 is a flow diagram of an example of computer executable instructions for integrating personalized notifications in mobile applications.

Referring now to FIG. 10, an example embodiment of computer executable instructions for providing personalized notifications is shown. At block 120, a server device associated with or used by the loyalty integration engine 22 receives transactional activity data associated with a user of the client device 12, e.g., by interfacing with one or more of the enterprise endpoints 24 to obtain client data 30. The loyalty integration engine 22, at block 122, receives loyalty data 32 associated with one or more loyalty offers that are eligible to the user. For example, the loyalty integration engine 22 can communicate with the loyalty hub platform 26 and/or receive third party events 28 from external source(s). At block 124, the loyalty integration engine 22 analyzes the activity data and the loyalty data 32 to correlate a spending indicator from the activity data with eligible offers determined from the loyalty data 32. For example, a certain type of spending pattern, a specific spend at a specific merchant or spending in a certain merchant or goods category can be identified to correlate with an appropriate and thus personalized offer or notification of an option to use or redeem or convert points, etc. At block 126, the loyalty integration engine 22 generates such a personalized notification based on the correlation and, at block 128, integrates the personalized notification in the GUI of the mobile app 20, e.g., as shown in FIGS. 4-9 by way of example. This can include referencing the nudge rules 34 as discussed above. The personalized notification can include one or more options to redeem loyalty points to execute the offer(s). At block 130, the loyalty integration engine 22 can receive an indication of a selected loyalty offer or otherwise selecting to see more information and, at block 132 sends an instruction to execute the selected loyalty offer, e.g., by launching the loyalty hub platform 26.

Figure 11:
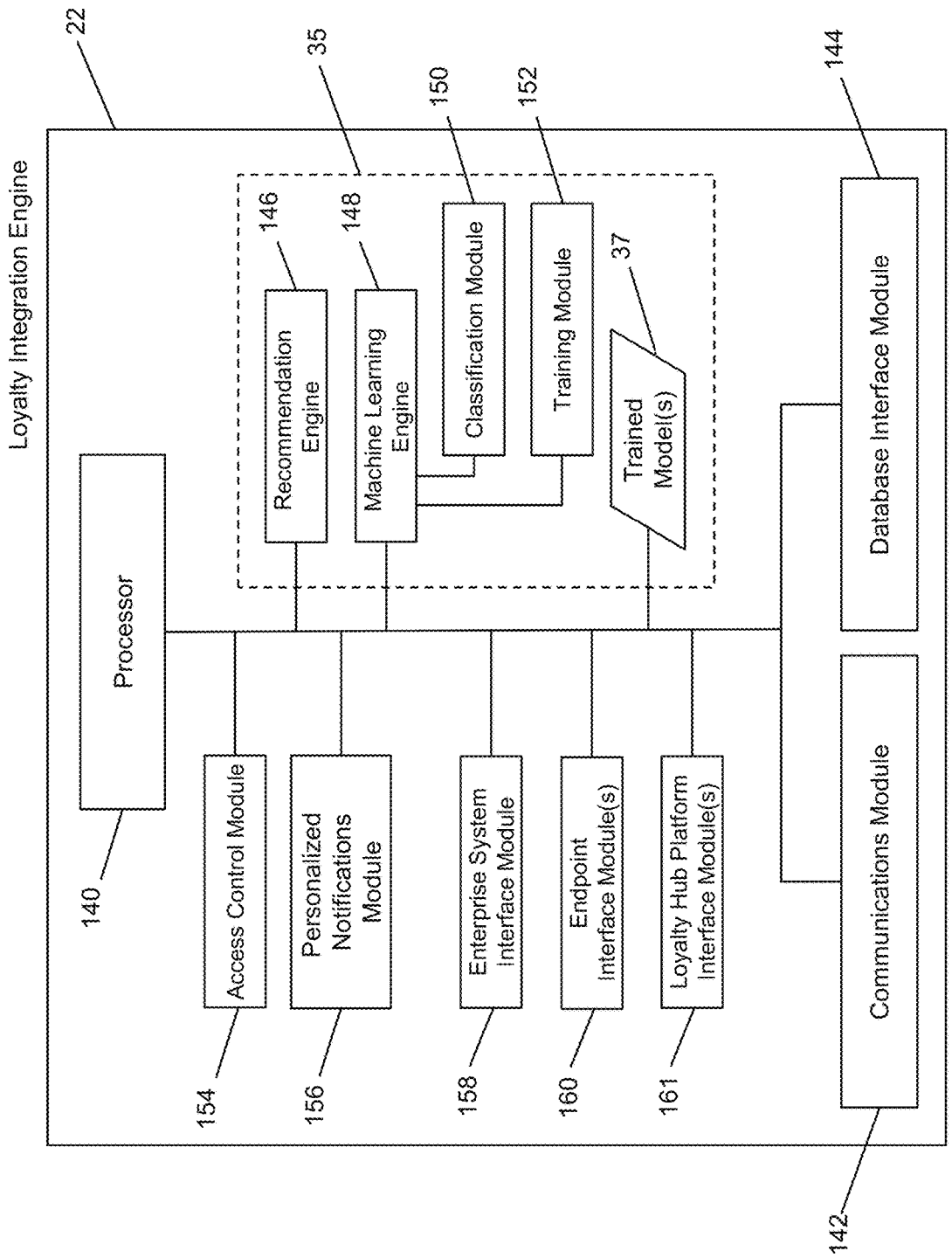
FIG. 11 is a block diagram of an example configuration of the loyalty integration engine.

In FIG. 11, an example configuration of the loyalty integration engine 22 is shown. In certain embodiments, the loyalty integration engine 22 may include one or more processors 140, a communications module 142, and a database interface module 144 for interfacing with the data 30, 32, 36, to retrieve, modify, and store (e.g., add) data. The loyalty integration engine 22 can be embodied as one or more server devices and/or other computing device(s) configured to operate within computing environment 8. Communications module 142 enables the loyalty integration engine 22 to communicate with one or more other components of the computing environment 8, such as client device 12 (or one of its components), via a bus or other communication network, such as the communication network 14, While not delineated in FIG. 11, the loyalty integration engine 22 includes at least one memory or memory device that can include a tangible and non-transitory computer-readable medium having stored therein computer programs, sets of instructions, code, or data to be executed by processor 140. FIG. 11 illustrates examples of modules, tools and engines stored in memory on the loyalty integration engine 22 and operated by the processor 140, It can be appreciated that any of the modules, tools, and engines shown in FIG. 11 may also be hosted externally and be available to the loyalty integration engine 22, e.g., via the communications module 142. In the example embodiment shown in FIG. 11, the loyalty integration engine 22 includes the machine learning system 35. The machine learning system 35 in this example includes a recommendation engine 146, a machine learning engine 148, a classification module 150, a training module 152, and the trained model 37. The loyalty integration engine 22 also includes an access control module 154, a personalized notifications module 156, an enterprise system interface module 158, and one or more endpoint interface modules 160.

The recommendation engine 146 is used by the loyalty integration engine 22 to generate one or more recommendations for integrating loyalty-related personalized notifications for the loyalty integration engine 22. It may be noted that a recommendation as used herein may refer to a prediction, suggestion, inference, association or other recommended identifier that can be used to generate a notification, message, content, or a combination thereof that provides data and/or information for preparing a personalized notification. The recommendation engine 146 can access the data 30, 32, 36 via the databases interface module 144 and apply one or more inference processes to generate the recommendation(s). The recommendation engine 146 may utilize or otherwise interface with the machine learning engine 148 to both classify data currently being analyzed to generate a suggestion or recommendation, and to train classifiers using data that is continually being processed and accumulated by the loyalty integration engine 22 (e.g., personalized notifications and triggers and/or interactions therewith, stored over time). That is, the recommendation engine 146 can learn when and where to provide personalized notifications and for which endpoint(s) 24 and generate and improve upon one or more trained models 37 over time.

The machine learning engine 148 may also perform operations that classify account data and/or other client data 30 in accordance with corresponding classifications parameters, e.g., based on an application of one or more machine learning algorithms to each of the groups of data 30, 32, 36. The machine learning algorithms may include, but are not limited to, a one-dimensional, convolutional neural network model (e.g., implemented using a corresponding neural network library, such as Keras®), and the one or more machine learning algorithms may be trained against, and adaptively improved, using elements of previously classified profile content identifying suitable matches between content identified and potential actions to be executed. Subsequent to classifying the conversation or contextual content, the recommendation engine 146 may further process each element of the content to identify, and extract, a value characterizing the corresponding one of the classification parameters, e.g., based on an application of one or more additional machine learning algorithms to each of the elements of the content. By way of example, the additional machine learning algorithms may include, but are not limited to, an adaptive NLP algorithm that, among other things, predicts starting and ending indices of a candidate parameter value within each element of the content, extracts the candidate parameter value in accordance with the predicted indices, and computes a confidence score for the candidate parameter value that reflects a probability that the candidate parameter value accurately represents the corresponding classification parameter. As described herein, the one or more additional machine learning algorithms may be trained against, and adaptively improved using, the locally maintained elements of previously classified content. Classification parameters may be stored and maintained using the classification module 150, and training data may be stored and maintained using the training module 152.

The trained model 37 may also be created, stored, refined, updated, retrained, and referenced by the loyalty integration engine 22 and/or enterprise system 16 to determine associations between users, transactions, interactions, conversations, third party data, or other contextual content. Such associations can be used to generate "people like you" recommendations or suggestions for personalized notifications based on what has worked or been done with other users.

In some instances, classification data stored in the classification module 150 may identify one or more parameters, e.g., "classification" parameters, that facilitate a classification of corresponding elements or groups of recognized content based on any of the exemplary machine learning algorithms or processes described herein. The one or more classification parameters may correspond to parameters that can indicate an affinity or compatibility between the data 30, 32, 36 and certain potential actions (e.g., as set out in the nudge rules 34).

In some instances, the additional, or alternate, machine learning algorithms may include one or more adaptive, NLP algorithms capable of parsing each of the classified portions of the profile content and predicting a starting and ending index of the candidate parameter value within each of the classified portions. Examples of the adaptive, NLP algorithms include, but are not limited to, NLP models that leverage machine learning processes or artificial neural network processes, such as a named entity recognition model implemented using a SpaCy® library.

Examples of these adaptive, machine learning processes include, but are not limited to, one or more artificial, neural network models, such as a one-dimensional, convolutional neural network model, e.g., implemented using a corresponding neural network library, such as Keras®. In some instances, the one-dimensional, convolutional neural network model may implement one or more classifier functions or processes, such as a Softmax® classifier, capable of predicting an association between an element of conversation or context data (e.g., something indicative of an action required by the user related to one of their accounts) and a single classification parameter and additionally, or alternatively, multiple classification parameters.

Based on the output of the one or more machine learning algorithms or processes, such as the one-dimensional, convolutional neural network model described herein, machine learning engine 148 may perform operations that classify each of the discrete elements of conversation or context content as a corresponding one of the classification parameters, e.g., as obtained from classification data stored by the classification module 150.

The outputs of the machine learning algorithms or processes may then be used by the recommendation engine 146 to generate one or more suggested actions that can be presented to the personalized notifications module 156 to generate a suitable personalized notification that is delivered according to the nudge rules 34.

Referring again to FIG. 11, the access control module 154 may be used to apply a hierarchy of permission levels or otherwise apply predetermined criteria to determine what client data 30 can be shared with which entity in the computing environment 8. For example, the loyalty integration engine 22 may have been granted access to certain sensitive client data 30 or financial data for a user, which is associated with a certain client device 12 in the computing environment 8. Similarly, certain client profile data stored in the client data 30 may include potentially sensitive information such as age, date of birth, or nationality, which may not necessarily be needed by the loyalty integration engine 22 to execute certain actions. As such, the access control module 154 can be used to control the sharing of certain client profile data or other client data 30 and/or content stored in the datastores for app data 36 and/or loyalty data 32 and/or client data 30 and/or other financial data based on a type of client/user, a permission or preference, or any other restriction imposed by the computing environment 8 or application in which the loyalty integration engine 22 is used.

The loyalty integration engine 22 may also include the personalized notifications module 156 configured to send alerts or notifications via appropriate channels via the mobile application server 18, based on actions determined appropriate by the loyalty integration engine 22. The loyalty integration engine 22 may also include one or more endpoint interface modules 160 to enable the loyalty integration engine 22 to integrate with and communicate with the enterprise endpoints 24 as discussed above. The interface module(s) 160 can take the form of an application programming interface (API), software development kit (SDK) or any other software, plug-in, agent, or tool that allows the loyalty integration engine 22 to be integrated with or within an application associated with another entity.

The loyalty integration engine 22 may also include an enterprise system interface module 158 to provide a graphical user interface (GUI) or API connectivity to communicate with the enterprise system 16 to obtain client data 30 and financial data for a certain user. It can be appreciated that the enterprise system interface module 158 may also provide a web browser-based interface, an application or "app" interface, a machine language interface, etc.

The loyalty integration engine 22 may also include a loyalty hub platform interface module 161 to provide a GUI or API connectivity to communicate with the loyalty hub platform 26 to obtain loyalty data 32 for a certain user. It can be appreciated that the loyalty hub platform interface module 161 may also provide a web browser-based interface, an application or "app" interface, a machine language interface, etc.

Figure 12:
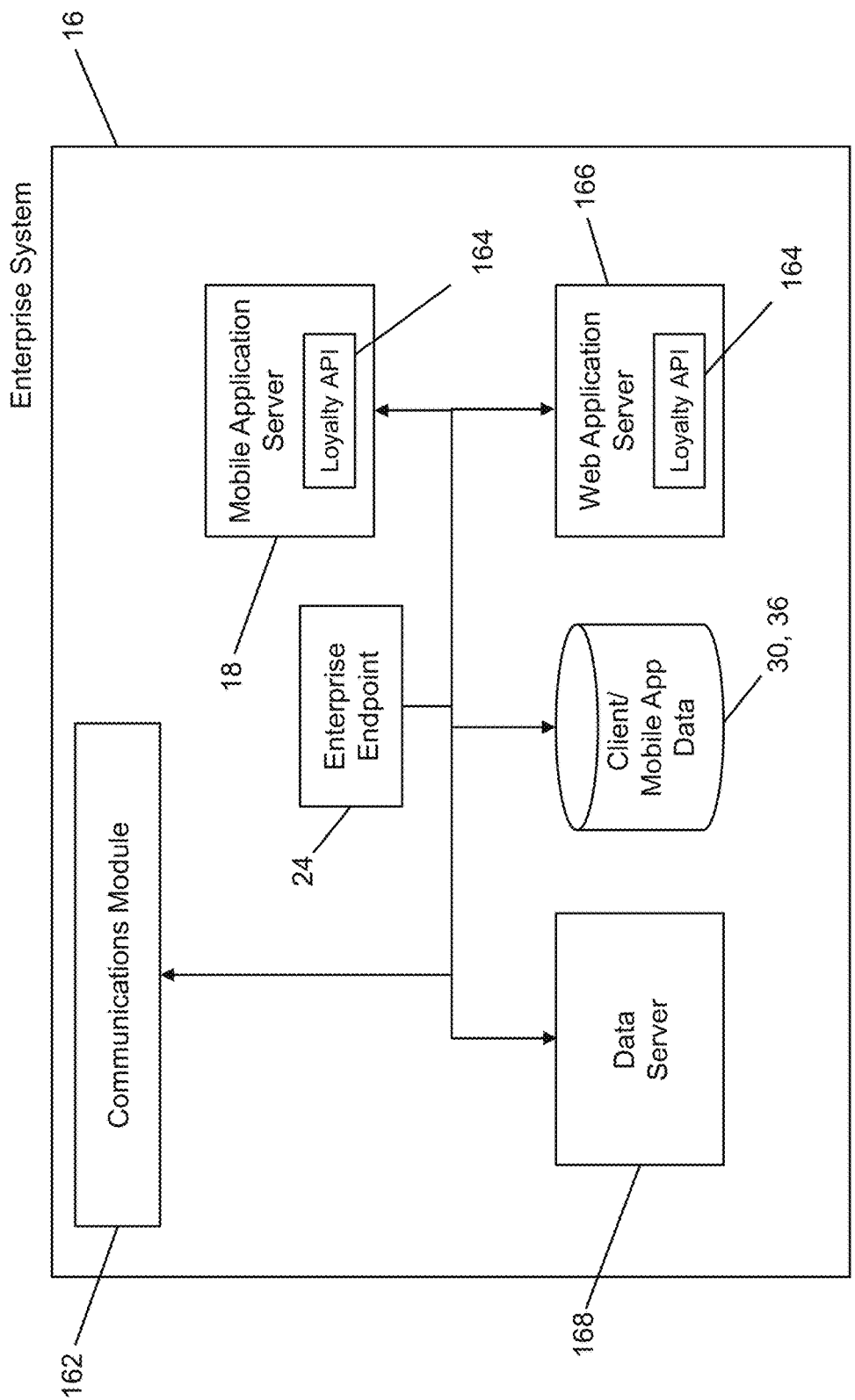
FIG. 12 is a block diagram of an example configuration of an enterprise system.

In FIG. 12, an example configuration of the enterprise system 16 is shown. The enterprise system 16 includes a communications module 162 that enables the enterprise system 16 to communicate with one or more other components of the computing environment 8, such as client device 12 (or one of its components) or loyalty integration engine 22, via a bus or other communication network, such as the communication network 14. While not delineated in FIG. 12, the system 16 includes at least one memory or memory device that can include a tangible and non-transitory computer-readable medium having stored therein computer programs, sets of instructions, code, or data to be executed by one or more processors (not shown for clarity of illustration). FIG. 12 illustrates examples of servers and datastores/databases operable within the system 16. It can be appreciated that any of the components shown in FIG. 12 may also be hosted externally and be available to the system 16, e.g., via the communications module 162. In the example embodiment shown in FIG. 12, the enterprise system 16 includes one or more servers to provide access to the client data 30 and/or mobile app data 36 to the loyalty integration engine 22 via or on behalf of the enterprise endpoint(s) 24 to enable the loyalty integration engine 22 to enable personalized notifications to be created and for personalized notifications to be learned, suggested and/or recommended to the user. Exemplary servers include the mobile application server 18, a web application server 166 and a data server 168. Although not shown in FIG. 12, as noted above, the system 16 may also include a cryptographic server for performing cryptographic operations and providing cryptographic services. The cryptographic server can also be configured to communicate and operate with a cryptographic infrastructure. The enterprise system 16 may also include one or more data storages for storing and providing data for use in such services, such as data storage for storing mobile app data 36 and/or client data 30.

Mobile application server 18 supports interactions with the mobile app 20 installed on client device 12. Mobile application server 18 can access other resources of the enterprise system 16 to carry out requests made by, and to provide content and data to, mobile app 20 on client device 12. In certain example embodiments, mobile application server 18 supports a mobile banking application to provide payments from one or more accounts of user, among other things. As shown in FIG. 12, the mobile application server 18 can include a loyalty API 164 which enables the mobile app 20 to integrate or otherwise coordinate or work with the loyalty integration engine 22 to provide loyalty-based personalized notification functionality. For example, the loyalty API 164 can communicate with the loyalty integration engine 22 via the enterprise system integration module 158 in the loyalty integration engine 22 (see FIG. 11).

Web application server 166 supports interactions using a website accessed by a web browser application 180 (see FIG. 13) running on the client device 12. It can be appreciated that the mobile application server 18 and the web application server 166 can provide different front ends for the same application, that is, the mobile (app) and web (browser) versions of the same application 20. For example, the enterprise system 16 may provide a banking application (with a loyalty page or loyalty functionality) that be accessed via a smartphone or tablet app while also being accessible via a browser on any browser-enabled device. As shown in FIG. 12, the web application server 166 may also include a loyalty API 164 to enable the web application to integrate or otherwise coordinate or work with the loyalty integration engine 22 to provide loyalty-based personalized notification functionality to a web version of the mobile app 20, if desired.

The client data 30 may include financial data, which can be associated with users of the client devices 12 (e.g., customers of the financial institution). The financial data may include any data related to or derived from financial values or metrics associated with customers of a financial institution associated with the enterprise system 16, for example, account balances, transaction histories, line of credit available, credit scores, mortgage balances, affordability metrics, investment account balances, investment values and types, among many others. Other metrics can be associated with the financial data, such as financial health data that is indicative of the financial health of the users of the client devices 12. As indicated above, it can be appreciated that the client data 30 shown in FIG. 2 may be part of the financial data held by the enterprise system 16 and is shown separately for ease of illustration and ease of reference herein. An enterprise endpoint 24 is shown in FIG. 12 for illustrative purposes. It can be appreciated that any one or more endpoints 24 may be located within the bounds of the enterprise system 16 as shown in FIG. 12 or may be located elsewhere and communicable therewith, as shown generally in FIG. 2.

Figure 13:
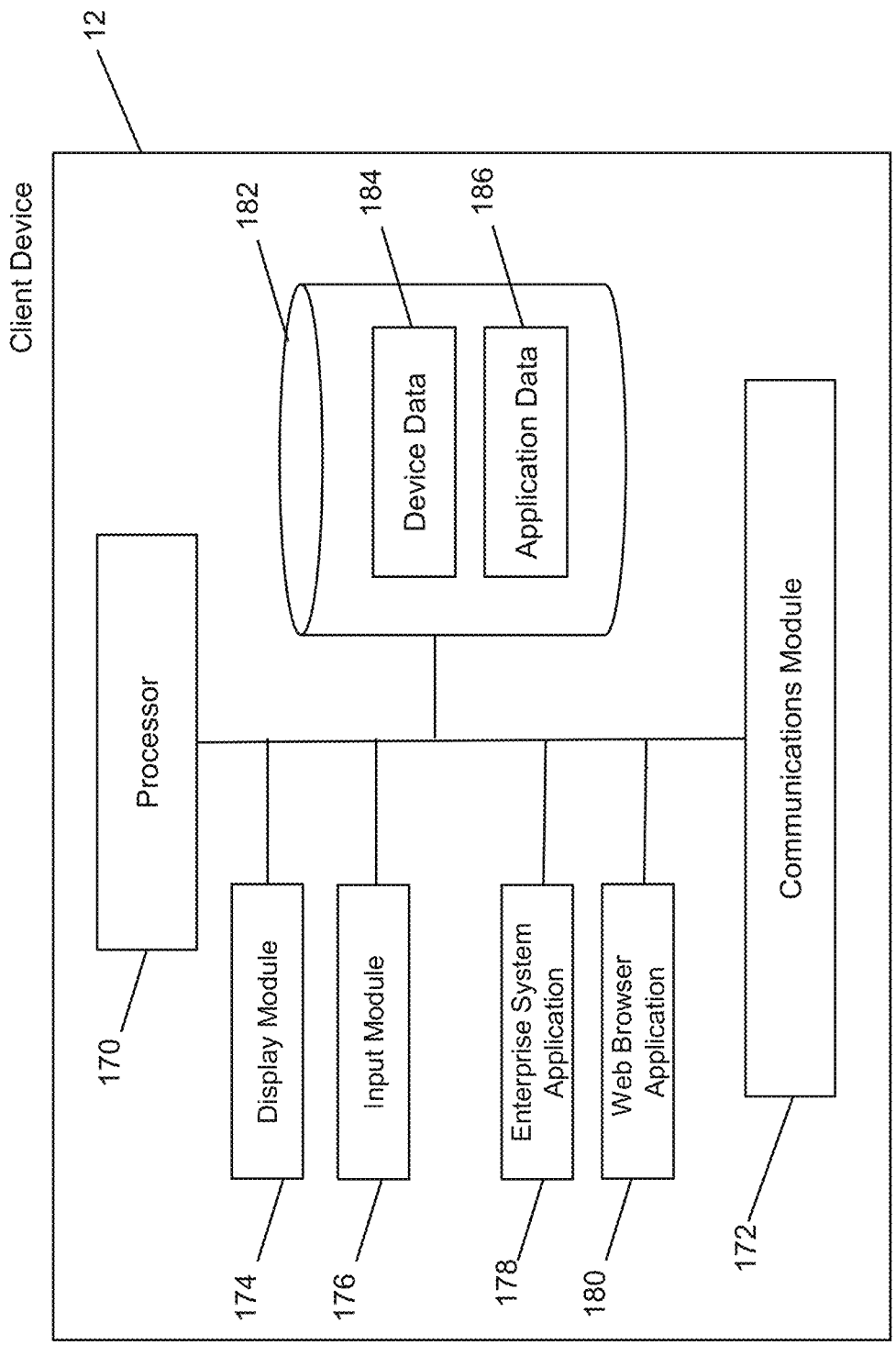
FIG. 13 is a block diagram of an example configuration of a client computing device associated with a user, customer, or client.

In FIG. 13, an example configuration of the client device 12 is shown. In certain embodiments, the client device 12 may include one or more processors 170, a communications module 172, and a data store 182 storing device data 184 and application data 186. Communications module 172 enables the client device 12 to communicate with one or more other components of the computing environment 8, such as loyalty integration engine 22 or enterprise system 16, via a bus or other communication network, such as the communication network 14. While not delineated in FIG. 13, the client device 12 includes at least one memory or memory device that can include a tangible and non-transitory computer-readable medium having stored therein computer programs, sets of instructions, code, or data to be executed by processor 170. FIG. 13 illustrates examples of modules and applications stored in memory on the client device 12 and operated by the processor 170. It can be appreciated that any of the modules and applications shown in FIG. 13 may also be hosted externally and be available to the client device 12, e.g., via the communications module 172.

In the example embodiment shown in FIG. 13, the client device 12 includes a display module 174 for rendering GUIs and other visual outputs on a display device such as a display screen, and an input module 176 for processing user or other inputs received at the client device 12. e.g., via a touchscreen, input button, transceiver, microphone, keyboard, etc. As noted above, the client device 12 can use such an input module 176 to gather inputs that are indicative of behavioral cues, facial recognition, presence detection, etc. The client device 12 may include an enterprise system application 178 provided by the enterprise system 16, e.g., for performing mobile banking operations and can be or be associated with the mobile app 20 described herein. The client device 12 in this example embodiment also includes a web browser application 180 for accessing Internet-based content, e.g., via a mobile or traditional website. The data store 182 may be used to store device data 184, such as, but not limited to, an IP address or a MAC address that uniquely identifies client device 12 within environment 8. The data store 182 may also be used to store application data 186, such as, but not limited to, login credentials, user preferences, cryptographic data (e.g., cryptographic keys), etc.

It will be appreciated that only certain modules, applications, tools and engines are shown in FIGS. 2 and 11 to 13 for ease of illustration and various other components would be provided and utilized by the advisor engine 22, enterprise system 16, and client device 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in loyalty integration engine 22, loyalty hub platform 26, or enterprise system 16, or client device 12, or accessible or connectable thereto. Any application or module herein described may be implemented using computer readable/executable instructions that may be stored or otherwise held by such computer readable media.

Figure 14:
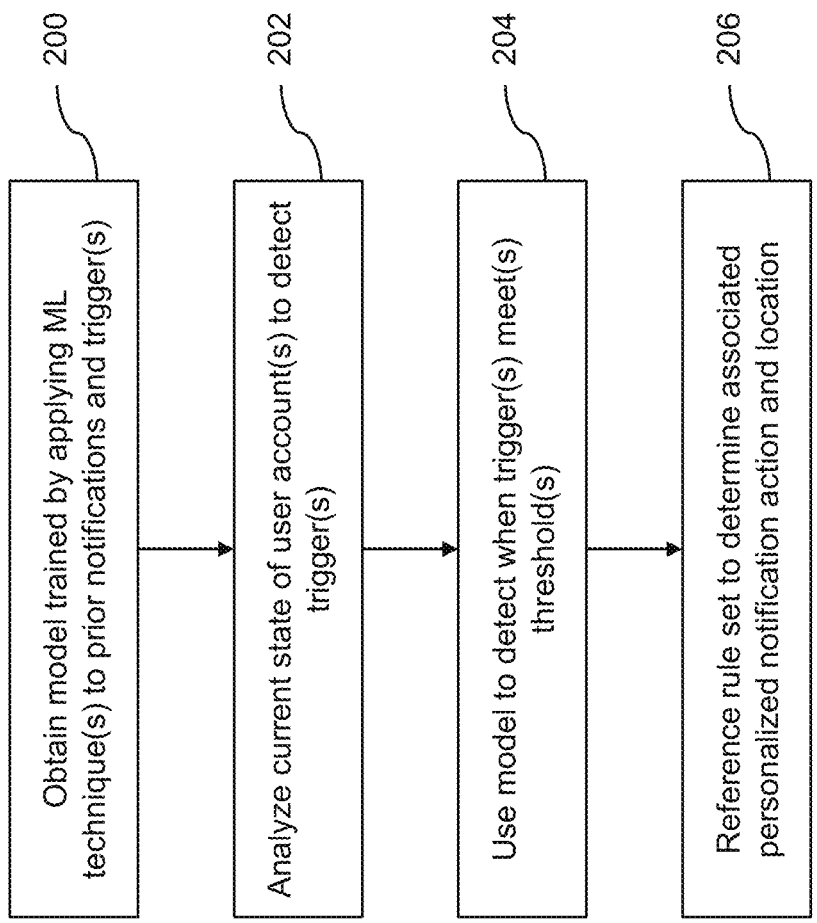
FIG. 14 is a flow diagram of an example of computer executable instructions for applying machine learning models to prior notification triggers to analyze current account activity and loyalty offers to generate personalized notifications.

Referring now to FIG. 14, an example embodiment of computer executable instructions for applying machine learning models trained on prior personalized notifications and interactions related thereto to a current state of a user's account(s) is shown. As noted above, the machine learning system 35 can be used to train app models 37 based on historical data pertaining to personalized notifications and interactions by users with such notifications. At block 200, the loyalty integration engine 22 obtains a model 37 trained by applying machine learning techniques to prior personalized notifications and triggers for providing such notifications. That is, the model 37 can be trained to appropriately detect when a personalized notification should be displayed so as to not overwhelm or annoy a user. The model 37 can also be built using data indicative of the effectiveness of certain triggers as well as interactions post notification that would be indicative of the effectiveness of the particular notification and/or its cadence, location, etc. With the model 37 being available to the loyalty integration engine 22, the loyalty integration engine 22, at block 202, analyzes the current state of a user's account(s) as well as current loyalty data 32 to detect one or more triggers. For example, the loyalty integration engine 22 can receive, retrieve or otherwise obtain client data 30 from one or more of the enterprise endpoints 24 periodically to determine if any of the data maps to or correlates with a trigger at block 204. Similarly, the loyalty integration engine 22 can periodically receive loyalty data 32 from the loyalty hub platform 26. Then, at block 206, the loyalty integration engine 22 can reference the rule set in the nudge rules 34 to determine the associated action, location in the mobile app 20 and cadence of when to display the notification. For example, the mobile app 20 or user preferences can dictate that a new notification should be displayed each time the mobile app 20 is opened or daily, weekly, etc.

As illustrated above, the mobile app 20 integrates a loyalty page 80 and can used the loyalty integration engine 22 to integrate loyalty-based personalized notifications. Moreover, as discussed, the mobile app 20 can provide links to the user to enable them to link loyalty accounts or otherwise leverage the loyalty hub platform 26 to benefit further from the integration provided by the loyalty integration engine 22.

Figure 15:
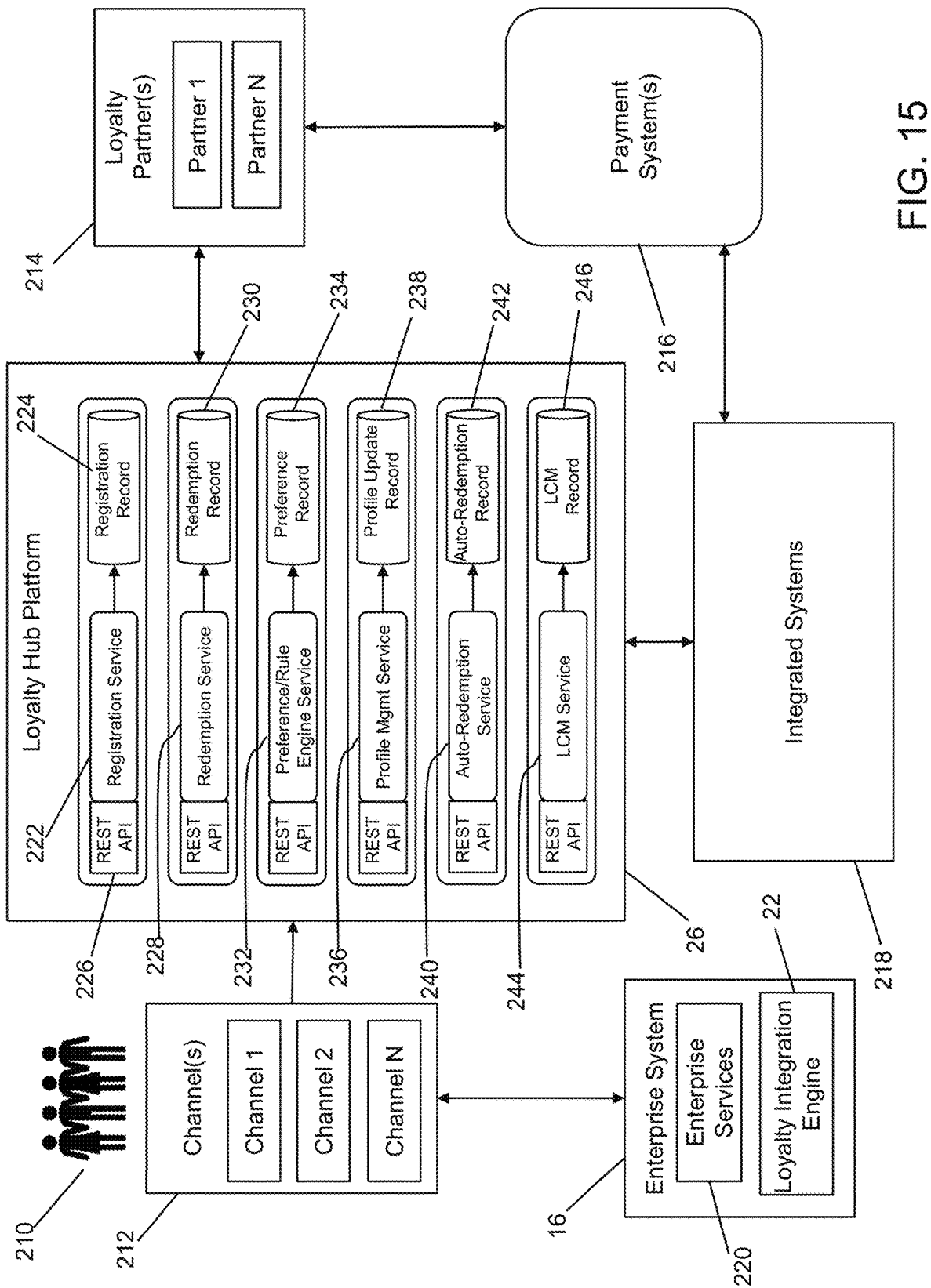
FIG. 15 is a schematic diagram of a loyalty hub platform integrated with an enterprise system and one or more loyalty partners.

FIG. 15 provides an example of a configuration for integrating the loyalty hub platform 26 with the enterprise system 16, one or more loyalty partner systems 214 (e.g., Partner 1, N for illustrative purposes); and one or more payment systems 216 used by the enterprise system 16 and loyalty partner system(s) 214 to enable customers 210 to process transactions. The customers 210 can also interact with the enterprise system 16 and the loyalty hub platform 26 via one or more communication channels 212, such as a mobile application, webpage or other via other channels 212 such as phone, text messaging, etc. Channels 1, 2, . . . N are shown for illustrative purposes. The loyalty hub platform 26 can also provide an intermediary entity enabling customers 210 to access or be redirected to the loyalty partner systems 214 via one of the channels 212 the customer 210 uses to interact with the enterprise system 16. For example, the customer 210 may be redirected to a loyalty app via a mobile banking app when managing registration, redemption, conversion or other processes related to rewards such as everyday rewards. Also shown in FIG. 15 are integrated systems 218 which can be separate (as shown) or part of the enterprise system 16 and/or payment system 216 to enable the loyalty hub platform 26 to access book of record (BoR) data, determine the eligibility of certain debit or credit cards, obtain access to financial transactions (e.g., transaction data and/or additional financial-related data not available via the transaction data). The enterprise system 16 in FIG. 15 also includes enterprise services 220 that can be leveraged by the loyalty hub platform 10, e.g., messaging, notifications, data analytics, etc.; and the loyalty integration engine 22 described in detail above.

The architecture for the loyalty hub platform 26 as shown in FIG. 15 includes a set of microservices to perform registration, redemption, apply rules, handle profiles, enable automatic redemptions, and handle lifecycle management. A microservice is a webservice which has a small and well-defined scope and is loosely coupled from any other webservice. The loyalty hub platform 26 includes a collection of microservices, each one self-contained and implementing a single and well defined business capability. Each service is a code base which can be managed by a small development team and does not need to share the same technology stack, library or frameworks, which allows each team to select the right tool for the job. This means, a single development team can build, deploy and test a service. These microservices provide a robust and scalable architecture for implementing the loyalty hub services on the platform 26.

The architecture shown in FIG. 15 assumes that customer linking with the loyalty partner system 214 is done at the customer level such that the loyalty partner membership is flagged to identify eligible customers and the loyalty partner system 214 can, based on this eligibility, give "accelerated" points on eligible purchases for all in-scope transaction cards offered by the enterprise system 16. Another assumption is that the loyalty hub databases store a customer's card level details. Also, the rewards accelerator can be enabled at the credit BoR by the loyalty hub platform 26 at the account level. The loyalty hub services include microservices that include or are coupled to a representational state transfer (REST) application programming interface (API) 226. Each microservice also includes its own distinct database or separate and distinct portion of a wider platform services database. In this example, a registration service 222 includes or has access to a registration record 224, a redemption service 228 includes or has access to a redemption record 230, a preference/rule engine service 232 includes a preference record 234, a profile management service 236 includes a profile update record 238, an auto-redemption service 240 includes an auto-redemption record 242, and a lifecycle management (LCM) service 244 includes an LCM record 246. It can be appreciated that the auto-redemption service 240 can be omitted or otherwise not utilized by a loyalty partner system 214 or particular linkage with the enterprise system 16 if an automatic redemption option is not utilized.

The registration service 222 fulfills a linked loyalty flow (see FIGS. 17*a*-17*b* described below) and is responsible for handling all orchestration required from the point that a customer 210 submits the linked loyalty flow on the enterprise system channel 212 onwards, including a call to the loyalty partner 214 (e.g., restaurant, coffee chain, etc.). Functions of the registration service 222 can include recording a history of all customer registration activity in the registration record 224, activating the acceleration rate for the enterprise system credit cards, notifying the loyalty partner system 214 of customer activity at the customer level, updating the profile management service 236 (see below) when a customer links cards to a loyalty partner and when a customer unlinks cards from loyalty partners, and providing a history of all customer linking/unlinking activity with a loyalty partner.

The redemption service 228 fulfills any transfer points to the loyalty partner (e.g., see flowchart in FIGS. 18*a* and 18*b*) and is responsible for handling all orchestration required from the point that a customer submits a one-time redemption through the enterprise system channel 212. The redemption service 228 can also process auto-redemption transactions. Functions of the redemption service 228 can include recording a history of all customer loyalty redemptions (transfer points to partner) in the redemption record 230, processing the enterprise system reward points redemption, notifying the loyalty partner of customer activity, and providing a history of all customer redemption activity with a loyalty partner.

The preference/rule engine service 232 maintains and validates loyalty hub business rules and is responsible for storing all of the business rules at a partner and card level for a loyalty program, e.g., in the preference record 234. The rule engine service 232 can also orchestrate the eligibility check of cards for linked loyalty and the transfer of points to partners (e.g., see FIGS. 17 and 18). Functions of the rule engine service 232 can also include providing an enterprise system card value proposition for each in-scope card with the loyalty partner (stored in the preference record 234), providing the loyalty partner and program information (also stored in the preference record 234), validating auto-redemption criteria stored in the preference record 234, validating one-time redemption criteria stored in preference record 234, running debit and credit card eligibility checks, and providing a list of loyalty hub frequently-asked questions (FAQs).

The profile management service 236 can be used to maintain a snapshot of the customer's linked enterprise system cards to loyalty partner(s) and can be made responsible for providing to the enterprise system channel(s) 212 the most up-to-date customer and loyalty partner linkage information. The profile management service 236 is also the gateway for customer eligibility for linked loyalty and transferring points to partners (see FIGS. 17-18). Functions of the profile management service 236 can include providing a list with cashback balances for each cashback product owned by the customer, providing a list with enterprise system rewards balances for each credit card product owned by the customer 210, providing a list of a customer's currently linked partners/products, providing a list of customer in-scope products for the loyalty partner, providing a list of customer eligible cards to transfer points to a partner or for auto-redemption, and providing rewards transactional histories.

The auto-redemption service 240 can be used to maintain and process customer auto-redemption details and is responsible for storing the most up-to-date customer auto-redemption instructions in the auto-redemption record 242, triggering the auto-redemption events, and orchestrating the required calls to perform same. Functions of the auto-redemption service 240 include time basing auto-redemption transactions, recording a history of all customer auto-redemption instructions, triggering auto-redemption events based on instructions, sending customer correspondence, updating the profile management service 236 (as noted above), processing enterprise system reward points redemptions, and notifying the loyalty partner of customer activity, e.g., which is delegated to the enterprise system's internal rewards/redemption service.

The LCM service 244 processes LCM events and is responsible for obtaining card event information for debit and credit card lifecycle updates and orchestrating calls to all impacted services. Functions of the LCM service 244 include processing credit card lifecycle events where a product transfer between eligible cards of the same reward takes place, processing credit card where a product transfer between eligible cards of different reward takes place, processing credit card lifecycle events where a credit card is closed, processing credit card lifecycle events where a debit card is closed, processing debit card lifecycle events where new card numbers are generated, processing credit card lifecycle events where new card numbers are generated, and processing customer new card openings.

The core microservices shown in FIG. 15 enable the loyalty partner systems 214 and the enterprise system 16 to link loyalty programs providing the flexibility to convert, transfer and/or accelerate points between programs. The individual microservices operate dynamically as described below based on event processing. This facilitates interface requests, integration actions through a common backend hub. The orchestration of the microservices by the loyalty hub platform 10 also ensures that the correct microservices are called as well as integrating inbound and outbound traffic with both the loyalty partner systems 214 and the payment systems 216 used to trigger the loyalty events. This arrangement avoids batch processing, which is more dynamic and allows one microservice to respond to an event (e.g., registration) even when another service is in a failure state (e.g., redemption or profile management, etc.). The independent services also enable customization on a partner-basis. For example, one loyalty partner system 214 may allow auto-redemption while others do not and the auto-redemption service 240 can be assigned to different loyalty partner systems 214 individually. Moreover, the microservice architecture allows additional microservices to be added, e.g., to add new features or offerings by the enterprise system 16 or loyalty partner(s) 214 on a permanent or temporary basis such as to handle promotional campaigns, etc. The incorporation of a preference/rule engine service 232 also enables individual rule sets to be applied and updated periodically on a partner-by-partner basis to avoid downtime when updating or upgrading linked loyalty campaigns.

Figure 16:
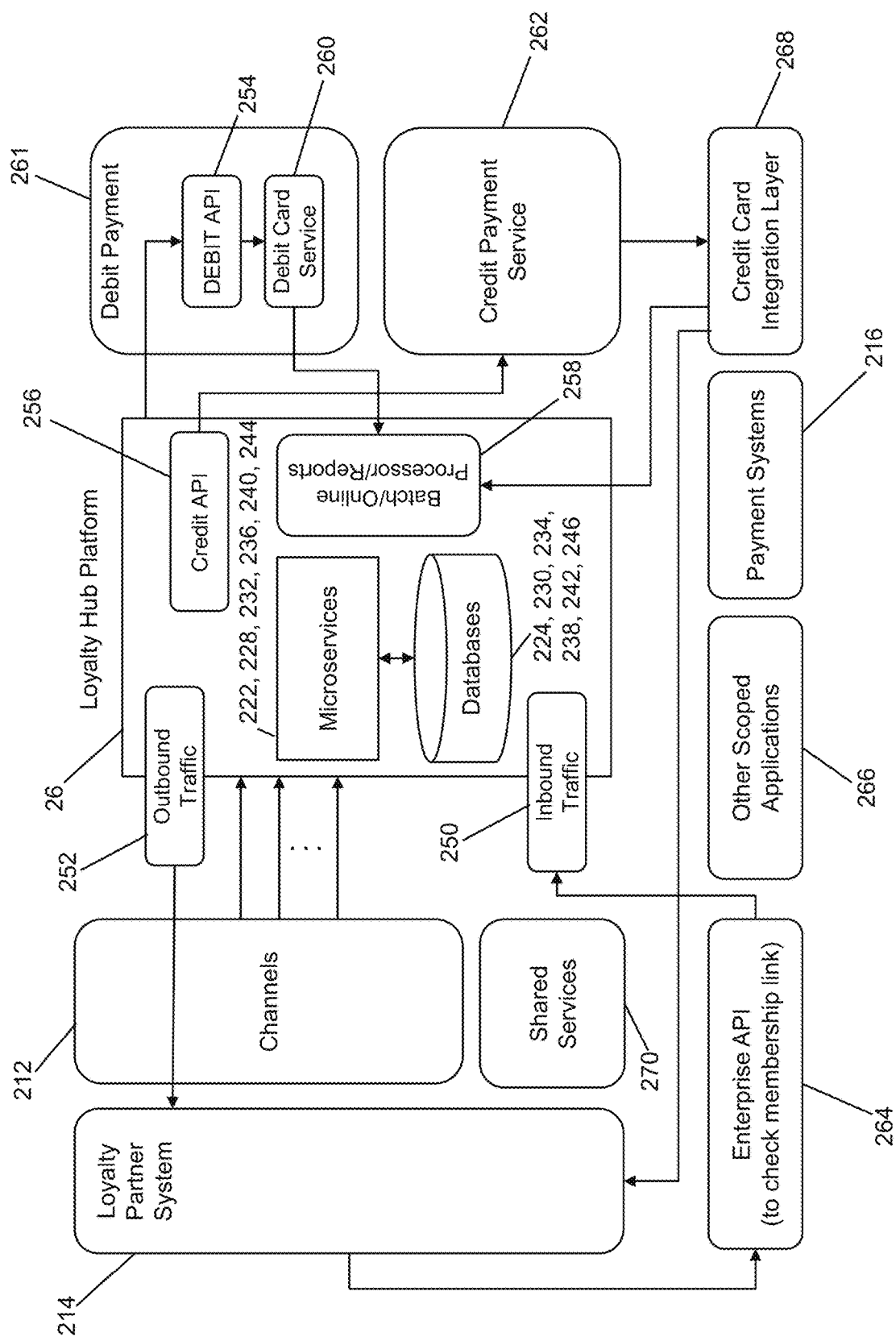
FIG. 16 is a block diagram illustrating the integration of the loyalty hub platform with a loyalty partner system, enterprise system, and payment infrastructure.

FIG. 16 provides an architectural configuration for the loyalty hub platform 26 to illustrate the integration with a loyalty partner system 214, a debit payment service 261, and a credit payment service 262 (e.g., TSYS). The debit and credit payment services 261, 262 are coupled to a batch/online processor/reports service 258 in the loyalty hub platform 26 to enable the platform 26 to detect payment events. Also shown in FIG. 16 is a credit card integration layer 268 and the payment systems 216 such as Interac®, Visa®, Mastercard®, etc. The architecture in FIG. 16 also enables other scoped applications 266 to be integrated with the services orchestrated by the loyalty hub platform 26. An enterprise API 264 is also shown, which provides a merchant application or other service within a loyalty partner system 214 to check membership links with the loyalty hub platform 26. The enterprise channels 212 and shared services 270 (e.g., knowledge management systems) an also integrate the loyalty partner systems 214 with the loyalty hub platform 26.

The loyalty hub platform 26 provides synchronous communication of the microservices 222, 228, 232, 236, 240, 244 and orchestration with each other. In this configuration, a service calls a REST API 226 that another service exposes, and the caller waits for a response from the receiver. An inbound traffic service 250 is shown, which can take the form of a service, microservice, API or other interface mechanism. The inbound traffic service 250 handles inbound data from the loyalty partner system(s) 214 via the enterprise API 264. Similarly, an outbound traffic service 252 is provided, which can take the form of a service, microservice, API or other interface mechanism. The outbound traffic service 252 handles data that is sent back to the loyalty partner system(s) 214 via the enterprise channel(s) 212 such as via a mobile or web application. The batch/online processor/reports service 258 monitors events from the payment systems 216, such as debit or credit transactions with cards that may be associated with the linked loyalty programs, via the credit card integration layer 268.

Data received at the inbound traffic service 250 as well as events detected by the batch/online process/reports service 258 (e.g., LCM event data) are read by the microservices, including the redemption service 228. Data received at the inbound traffic service 250 may, along with other outputs from the microservices, flow to a credit API 256 (e.g., TSYS) to be communicated to a credit card payment service 262. Similarly, various events such as eligibility redemptions can be communicated to a debit card payment system 261 via a debit API 254. Delinking events, eligibility redemption and other events may also feed to the outbound traffic service 252 to communicate events back to the associated loyalty partner system 214. The individual microservices and corresponding database records can be used to dynamically handle events both synchronously and asynchronously. In this way, multiple loyalty partners 214 can be integrated into the loyalty hub platform 26 independently without requiring batch processing or being susceptible to failovers and outages on one particular service.

Figure 17A:
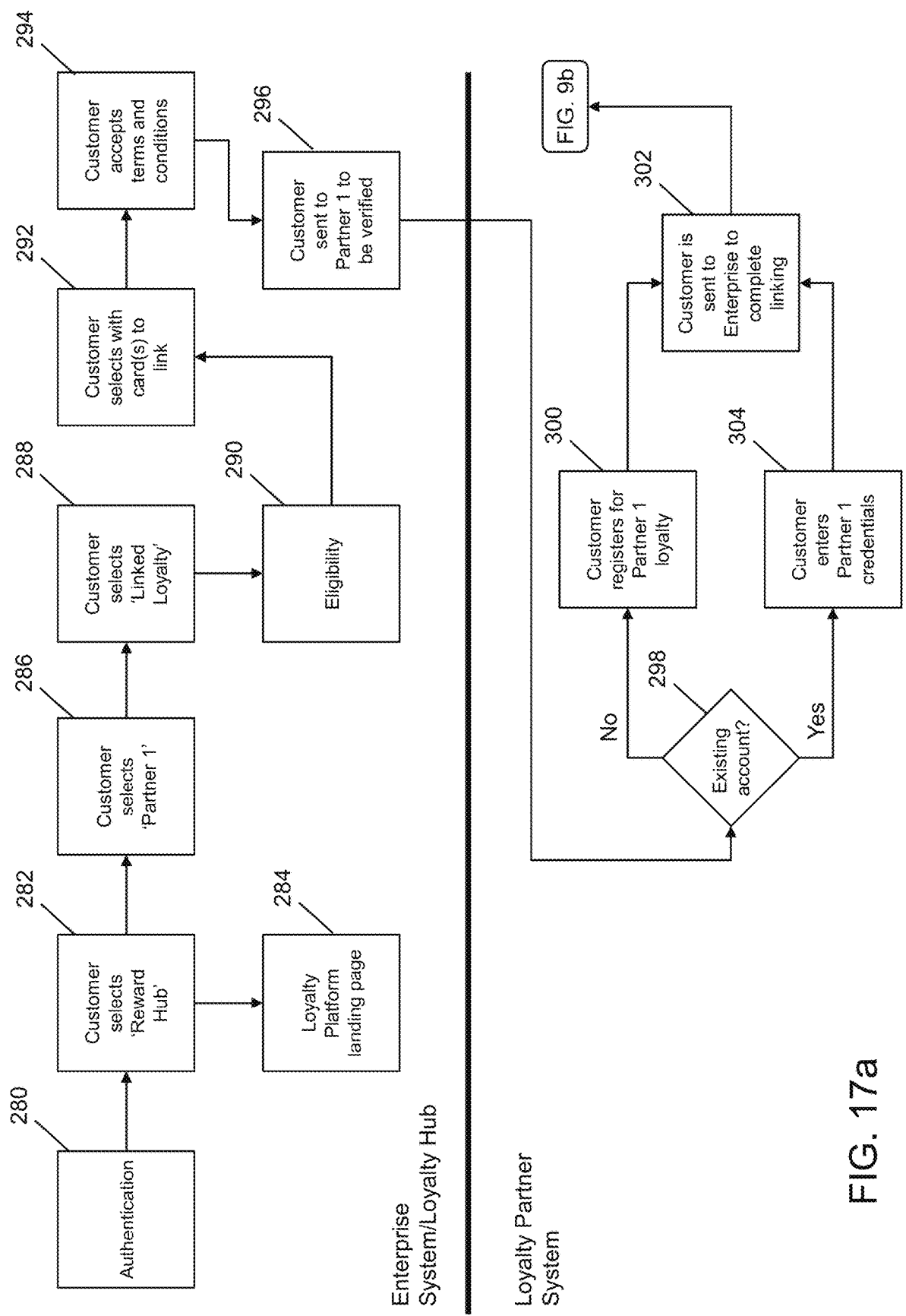
FIGS. 17a and 17b are a flow diagram of an example of computer executable instructions for linking loyalty programs via the loyalty hub platform.
Figure 17B:
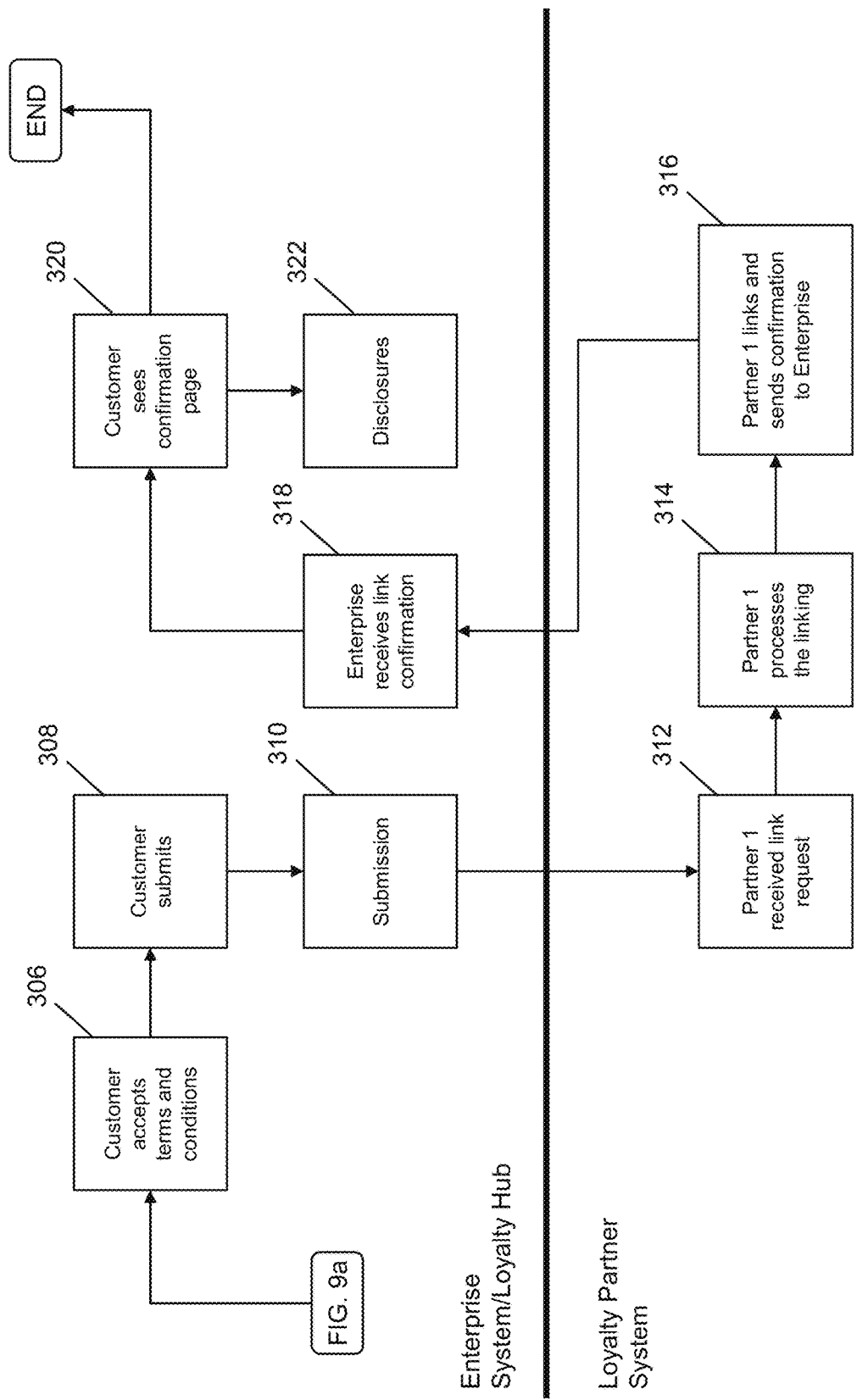

Turning now to FIGS. 17a and 17b, a flow diagram is provided to illustrate linking loyalty programs via the loyalty hub platform 26. Beginning with FIG. 17a, after an authentication operation at 280 the customer selects a Reward Hub option, tab, page, etc. at 282 which brings them to a Loyalty Platform landing page at 284. The customer can then select a loyalty partner, in this example Partner 1 at 286 and select an option to enable Linked Loyalty at 288. This generates an eligibility list at 290, e.g., of payment and credit cards that are eligible for linked loyalty, allowing the customer to select the card(s) to link at 292. The customer can then accept terms and conditions at 294 (and/or any additional operations required to move forward) and the customer is navigated to Partner 1 to be verified by connecting into the associated loyalty partner system 214. At the loyalty partner system 214, the loyalty partner determines at 298 if the customer has an existing account with them. If not, the customer is registered for Partner 1's loyalty program at 300. If the customer is registered, the customer is asked to enter their credentials at 304. The customer is then sent to the enterprise system 16 or loyalty hub platform 26 at 302 to complete the linking as shown in FIG. 17b.

Referring now to FIG. 17b, at the enterprise system 16 or loyalty hub platform 26 the customer accepts terms and conditions at 306 and selects a submit option at 308. This results in a submission made at 310 back to the loyalty partner system 214. At 312 Partner 1 receives a link request and processes the linking operation at 314. Partner 1 then links the loyalty accounts and sends a confirmation to the enterprise at 316, e.g., by communicating with the enterprise system 16 or loyalty hub platform 26. At 318 the enterprise receives the link confirmation and displays a confirmation page to the customer 210 at 320. At 322 a disclosures operation can be performed, e.g., to make any necessary disclosures to the customer 210.

Figure 18A:
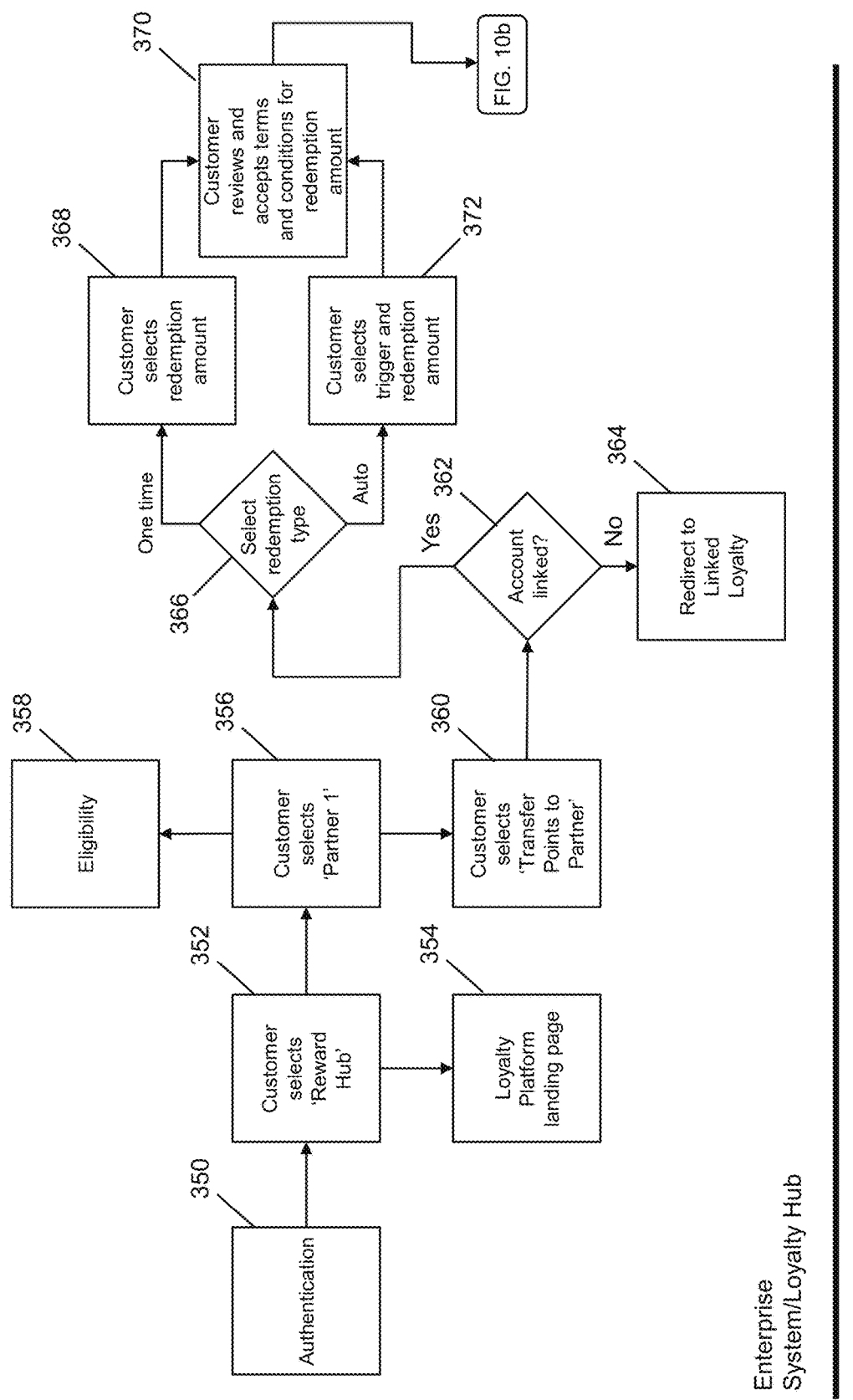
FIGS. 18a and 18b are a flow diagram of an example of computer executable instructions for transfer loyalty points to a loyalty partner.
Figure 18B:
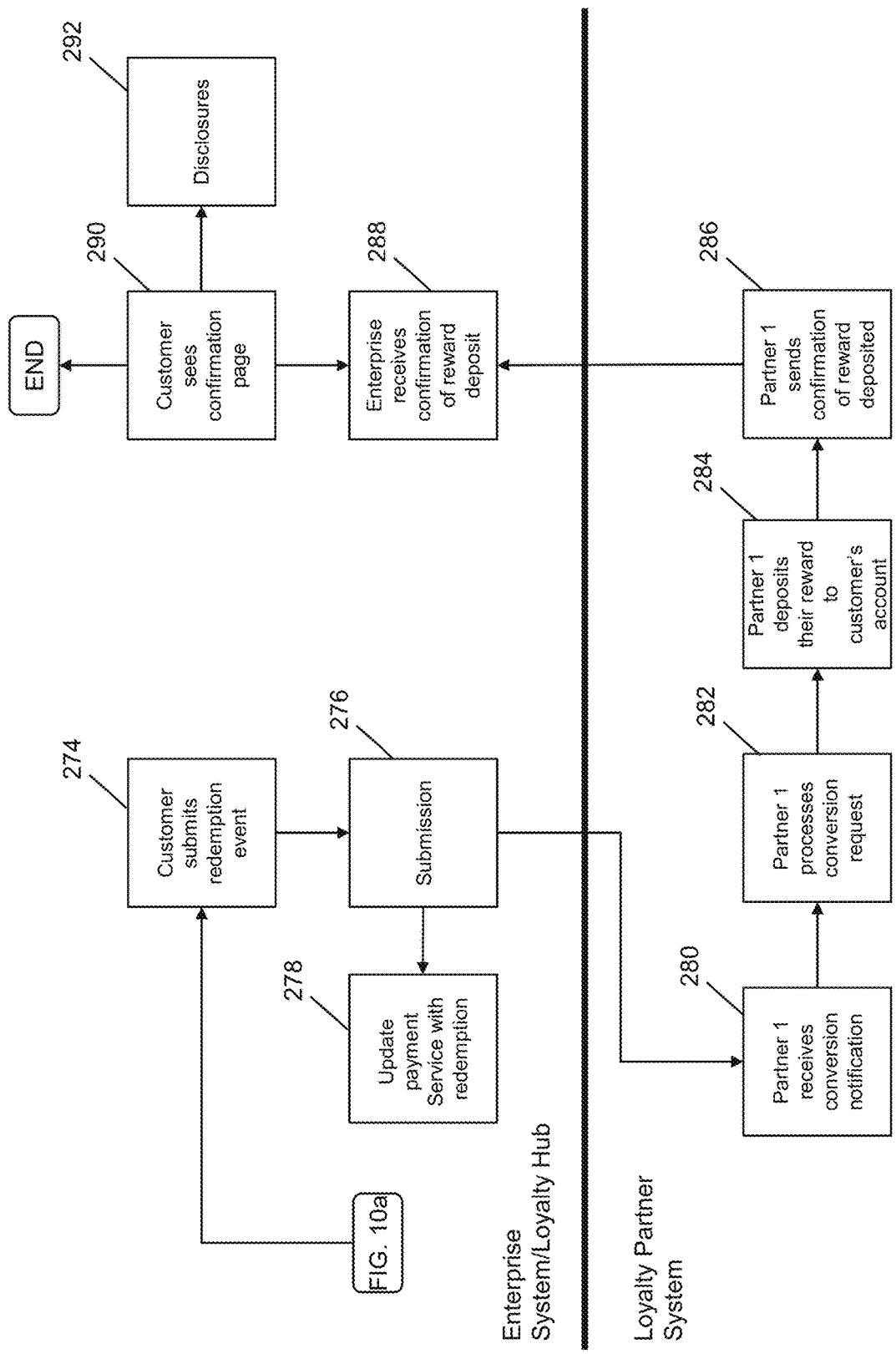

FIGS. 18a and 18b provide a flow diagram for transferring loyalty points to a loyalty partner. Referring first to FIG. 18a, after an authentication operation at 350 the customer selects a Reward Hub option, tab, page, etc. at 352 which brings them to a Loyalty Platform landing page at 354. The customer can then select a loyalty partner, in this example Partner 1 at 356, which calls an eligibility process at 358 to determine the customer's eligibility to transfer loyalty points. At 360 the customer selects a "Transfer Points to Partner" option, which causes the loyalty hub platform 26 to determine if the account is linked with that partner loyalty program at 362. If not, the customer 210 is redirected to the linked loyalty flow in FIGS. 17a and 17b at 364. If the customer 210 is linked to that partner, the customer can select a redemption type at 366. In this example, the redemption types can include one time or automatic (auto) redemption. If selecting a one-time redemption the customer selects the redemption amount at 368. If the selecting an auto redemption the customer selects a trigger and the redemption amount when that trigger is detected at 372. The customer 210 then reviews and accepts any terms and conditions for the redemption amount at 370 and the process proceeds to FIG. 18b.

Referring now to FIG. 18b, the customer submits the redemption event at 374 and the submission is made at 376 causing the payment service (e.g., TSYS) to be updated with the redemption amount at 378. Partner 1 then receives a conversion notification at 380 and processes the conversion request at 382. Partner 1 then deposits the reward to the customer's account in their loyalty program at 384 and sends a confirmation of reward deposited to the loyalty hub platform 26 at 386. The enterprise (e.g., at loyalty hub platform 26) receives the confirmation at 388 and the confirmation page is displayed to the customer at 390. At 392 a disclosures operation can be performed, e.g., to make any necessary disclosures to the customer 210.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A server device for providing personalized notifications in mobile applications, the server device comprising:
a processor;
a communications module coupled to the processor; and
a memory coupled to the processor, the memory storing computer executable instructions that when executed by the processor cause the processor to:
receive from a plurality of endpoints of an enterprise system, via the communications module, transactional activity data from the plurality of endpoints associated with a user of a client device;
receive, at a loyalty platform of the server device, the loyalty platform for integrating with multiple loyalty systems and the plurality of endpoints, from at least one loyalty system, via the communications module, loyalty data associated with loyalty offers eligible to the user of the client device;
analyze the transactional activity data from the plurality of endpoints and the loyalty data to correlate at least one spending indicator from the transactional activity data from the plurality of endpoints with at least one of the eligible loyalty offers;
operate an integration engine positioned between a server of a mobile application and the plurality of endpoints of the enterprise system, the integration engine generating personalized notifications based on the analyzed transactional activity data from the plurality of endpoints and the loyalty data;
use the integration engine to: (1) integrate a personalized notification into a graphical user interface (GUI), and (2) determine, via a machine learning model trained to determine timing for providing personalized notifications based on past interactions within the GUI, a timing of integrating the personalized notification into the GUI, the personalized notification comprising at least one option to redeem loyalty points via a platform enabled redemption service to execute a selected eligible loyalty offer, and the integration engine coordinates between the GUI and the loyalty platform;
receive from the mobile application, via the communications module, an indication of the selected loyalty offer;
in response to the loyalty platform receiving the indication, send, via the platform enabled redemption service, to the corresponding loyalty system, an instruction to execute the selected eligible loyalty offer; and
receive confirmation from the corresponding loyalty system of successful execution of the selected eligible loyalty offer.

2. The server device of claim 1, wherein the computer executable instructions further cause the processor to:
receive at the loyalty platform, from a third party entity, via the communications module, event data associated with at least one loyalty system having eligible offers redeemable via the mobile application; and
use the event data to determine the timing of integrating the personalized notification into the graphical user interface.

3. The server device of claim 2, wherein the event data is associated with a promotional event for which the selected loyalty offer is useable.

4. The server device of claim 1, wherein the at least one spending indicator is indicative of a transaction that could have used loyalty points to offset a purchase, the notification providing an option to retroactively apply loyalty points to the transaction.

5. The server device of claim 1, the loyalty platform comprising a hub architecture for integrating multiple loyalty partners, and the mobile application is a banking application.

6. The server device of claim 1, wherein the computer executable instructions further cause the processor to:
determine a user defined goal associated with the at least one loyalty system, and
use the user defined goal to determine the personalized notification or an additional notification to be displayed in the graphical user interface.

7. The server device of claim 1, wherein the computer executable instructions further cause the processor to:
automatically determine correlations between the transactional activity data and the loyalty data using the machine learning model; and
generate the personalized notification based on a specific correlation.

8. The server device of claim 7, wherein the model is periodically retrained using tracking data indicative of usage of the personalized notifications during a previous period of time.

9. The server device of claim 1, wherein the computer executable instructions further cause the processor to:
receive from the at least one loyalty system, via the communications module, redemption data associated with past loyalty redemptions by the user; and
use the redemption data with a correlation from the analyzing to generate the personalized notification.

10. A method of providing personalized notifications in mobile applications, the method executed by a server device and comprising:
receiving from a plurality of endpoints of an enterprise system, via the communications module, transactional activity data from the plurality of endpoints associated with a user of a client device;
receiving, at a loyalty platform of the server device, the loyalty platform for integrating with multiple loyalty systems and the plurality of endpoints, from at least one loyalty system, via the communications module, loyalty data associated with loyalty offers eligible to the user of the client device;
analyzing the transactional activity data from the plurality of endpoints and the loyalty data to correlate at least one spending indicator from the transactional activity data from the plurality of endpoints with at least one of the eligible loyalty offers;

operating an integration engine positioned between a server of a mobile application and the plurality of endpoints of the enterprise system, the integration engine generating personalized notifications based on the analyzed transactional activity data from the plurality of endpoints and the loyalty data;

using the integration engine to: (1) integrate a personalized notification into a graphical user interface (GUI), and (2) determine, via a machine learning model trained to determine timing for providing personalized notifications based on past interactions within the GUI, a timing of integrating the personalized notification into the GUI, the personalized notification comprising at least one option to redeem loyalty points via a platform enabled redemption service to execute a selected eligible loyalty offer, and the integration engine coordinates between the GUI and the loyalty platform;

receiving from the mobile application, an indication of the selected loyalty offer;

in response to the loyalty platform receiving the indication, sending, via the platform enabled redemption service, to the corresponding loyalty system, an instruction to execute the selected eligible loyalty offer; and receiving confirmation from the corresponding loyalty system of successful execution of the selected eligible loyalty offer.

11. The method of claim 10, further comprising:
receiving at the loyalty platform, from a third party entity, event data associated with at least one loyalty system having eligible offers redeemable via the mobile application; and
using the event data to determine the timing of integrating the personalized notification into the graphical user interface.

12. The method of claim 10, wherein the at least one spending indicator is indicative of a transaction that could have used loyalty points to offset a purchase, the notification providing an option to retroactively apply loyalty points to the transaction.

13. The method of claim 10, wherein the at least one spending indicator is indicative of transactions with a loyalty partner of the enterprise system that has available rewards or points.

14. The method of claim 10, wherein the loyalty platform comprising a hub architecture for integrating multiple loyalty partners, and the mobile application is a banking application.

15. The method of claim 10, further comprising:
determining a user defined goal associated with the at least one loyalty system, and
using the user defined goal to determine the personalized notification or an additional notification to be displayed in the graphical user interface.

16. The method of claim 10, further comprising:
automatically determine correlations between the transactional activity data and the loyalty data using the machine learning model; and
generating the personalized notification based on a specific correlation.

17. The method of claim 16, wherein the model is periodically retrained using tracking data indicative of usage of the personalized notifications during a previous period of time.

18. The method of claim 10, further comprising:
receiving from the at least one loyalty system, via the communications module, redemption data associated with past loyalty redemptions by the user; and
using the redemption data with a correlation from the analyzing to generate the personalized notification.

19. A non-transitory computer readable medium for providing personalized notifications in mobile applications, the computer readable medium comprising computer executable instructions for:
receiving from a plurality of endpoints of an enterprise system, via the communications module, transactional activity data from the plurality of endpoints associated with a user of a client device;
receiving, at a loyalty platform of the server device, the loyalty platform for integrating with multiple loyalty systems and the plurality of endpoints, from at least one loyalty system, via the communications module, loyalty data associated with loyalty offers eligible to the user of the client device;
analyzing the transactional activity data from the plurality of endpoints and the loyalty data to correlate at least one spending indicator from the transactional activity data from the plurality of endpoints with at least one of the eligible loyalty offers;
operating an integration engine positioned between a server of a mobile application and the plurality of endpoints of the enterprise system, the integration engine generating personalized notifications based on the analyzed transactional activity data from the plurality of endpoints and the loyalty data;
using the integration engine to: (1) integrate a personalized notification into a graphical user interface (GUI), and (2) determine, via a machine learning model trained to determine timing for providing personalized notifications based on past interactions within the GUI, a timing of integrating the personalized notification into the GUI, the personalized notification comprising at least one option to redeem loyalty points via a platform enabled redemption service to execute a selected eligible loyalty offer, and the integration engine coordinates between the GUI and the loyalty platform;
receiving from the mobile application, an indication of the selected loyalty offer;
in response to the loyalty platform receiving the indication, sending, via the platform enabled redemption service, to the corresponding loyalty system, an instruction to execute the selected eligible loyalty offer; and
receiving confirmation from the corresponding loyalty system of successful execution of the selected eligible loyalty offer.

20. The server device of claim 1, wherein the computer executable instructions further cause the processor to:
determine one or more of a location and a trigger to control displaying a nudge card of the personalized notification within of the mobile application.

* * * * *